United States Patent [19]
Yoshino et al.

[11] Patent Number: 5,548,304
[45] Date of Patent: Aug. 20, 1996

[54] METHOD AND APPARATUS FOR SCREEN DISPLAYING

[75] Inventors: Hitoshi Yoshino, Chiba; Keiji Oshima, Katsuta; Hisanori Miyagaki, Hitachiohta, all of Japan

[73] Assignee: Hitachi, Ltd., Tokyo, Japan

[21] Appl. No.: 568,484

[22] Filed: Aug. 16, 1990

[30] Foreign Application Priority Data

Aug. 18, 1989 [JP] Japan ..................... 1-211352

[51] Int. Cl.⁶ .................. G09G 5/08; G09G 5/14
[52] U.S. Cl. .............. 345/145; 345/119; 345/157
[58] Field of Search ............... 340/706, 709, 340/710, 717, 721, 723; 178/18; 273/148 B; 364/518, 521; 345/145, 119, 157

[56] References Cited

U.S. PATENT DOCUMENTS

| | | | |
|---|---|---|---|
| 4,116,444 | 9/1978 | Mayer et al. | 340/709 |
| 4,259,725 | 3/1981 | Andrews et al. | 340/724 |
| 4,651,299 | 3/1987 | Mayazaki et al. | 340/706 |
| 4,884,068 | 11/1989 | Matheny et al. | 340/710 |
| 4,924,433 | 5/1990 | Hirata et al. | 340/709 |
| 4,975,690 | 12/1990 | Torres | 340/721 |
| 5,047,754 | 9/1991 | Akatsuka et al. | 340/709 |

FOREIGN PATENT DOCUMENTS

| | | | |
|---|---|---|---|
| 0066025 | 5/1980 | Japan | 340/709 |
| 0169838 | 10/1982 | Japan | 340/709 |
| 0091589 | 5/1984 | Japan | 340/709 |
| 63-306491 | 12/1988 | Japan . | |
| 0110595 | 5/1991 | Japan | 340/709 |
| 2190569 | 11/1987 | United Kingdom | 340/709 |

*Primary Examiner*—Richard Hjerpe
*Assistant Examiner*—M. Fatahiyar
*Attorney, Agent, or Firm*—Fay, Sharpe, Beall, Fagan, Minnich & McKee

[57] ABSTRACT

Conflicting requests for cursor control of displaying are resolved by priority. The cursors can reflect attributes of their control or those of their control units, with visual attributes being color, shape or the like. Priority may be established between each cursor and a range of areas acceptable for cursor movement subdivided from the screen, or according to a priority of allowable functions, or according to a priority of conflicting operating times, or a combination of the same. Simultaneous control of a plurality of cursors can be permitted when there is no conflict.

10 Claims, 23 Drawing Sheets

FIG. 3

| CURSOR CONTROL UNIT ID | USER ID |
|---|---|
| $CC_1$ | $U_7$ |
| $CC_2$ | $U_3$ |
| $CC_3$ | 0 |
| $CC_4$ | $U_{21}$ |
| $CC_n$ | $U_{19}$ |

| CURSOR CONTROL UNIT ID | CURSOR ID |
|---|---|
| $CC_1$ | $CS_3$ |
| $CC_2$ | $CS_1$ |
| $CC_3$ | $CS_7$ |
| $CC_4$ | 0 |
| $CC_n$ | $CS_2$ |

| CURSOR ID | "WAIT FOR CUSOR" | | | |
|---|---|---|---|---|
| | ORDER OF 1 | ORDER OF 2 | ---------- | ---------- |
| $CS_1$ | $CC_9$ | $CC_{21}$ | | |
| $CS_2$ | | | | |
| $CS_3$ | $CC_{16}$ | | | |
| $CS_4$ | | | | |
| $CS_5$ | $CC_{13}$ | $CC_2$ | | |
| $CS_m$ | | | | |

| CURSOR ID | X COORDINATE ON SCREEN | Y COORDINATE ON SCREEN | PAGE ID | X COORDINATE ON PAGE | Y COORDINATE ON PAGE |
|---|---|---|---|---|---|
| $CS_1$ | $X_1$ | $Y_1$ | $P_1$ | $PX_1$ | $PY_1$ |
| $CS_2$ | $X_2$ | $Y_2$ | $P_1$ | $PX_2$ | $PY_2$ |
| $CS_3$ | $X_3$ | $Y_3$ | $P_2$ | $PX_3$ | $PY_3$ |
| $CS_m$ | $X_N$ | $Y_N$ | $P_3$ | $PX_N$ | $PY_N$ |

| CURSOR ID | CURSOR SHAPE |
|---|---|
| 1 | SHAPE 1 |
| 2 | SHAPE 2 |
| 3 | SHAPE 3 |
| 4 | SHAPE 4 |
| 5 | |

| CURSOR ID | CURSOR COLOR |
|---|---|
| 1 | COLOR 1 |
| 2 | COLOR 2 |
| 3 | COLOR 3 |
| 4 | COLOR 4 |
| 5 | |

| CURSOR ID | CURSOR LUMINANCE |
|---|---|
| 1 | LUMINANCE 1 |
| 2 | LUMINANCE 2 |
| 3 | LUMINANCE 3 |
| 4 | LUMINANCE 4 |
| 5 | |

FIG. 7(d)

| CURSOR ID | CURSOR LUMINANCE CYCLE |
|---|---|
| 1 | CYCLE 1 |
| 2 | CYCLE 2 |
| 3 | CYCLE 3 |
| 4 | CYCLE 4 |
| 5 | |

FIG. 7(e)

| CURSOR ID | SOUND DURING CURSOR OPERATION |
|---|---|
| 1 | SOUND 1 |
| 2 | SOUND 2 |
| 3 | SOUND 3 |
| 4 | SOUND 4 |
| 5 | |

FIG. 8(a)

| ID | KIND OF TRACE LINE |
|----|--------------------|
| 1  | KIND 1             |
| 2  | KIND 2             |
| 3  | KIND 3             |
| 4  | KIND 4             |
| 5  |                    |

FIG. 8(b)

| ID | TRACE LINE COLOR |
|----|------------------|
| 1  | COLOR 1          |
| 2  | COLOR 2          |
| 3  | COLOR 3          |
| 4  | COLOR 4          |
| 5  |                  |

FIG. 8(c)

| ID | TRACE LINE WIDTH |
|----|------------------|
| 1  | WIDTH 1          |
| 2  | WIDTH 2          |
| 3  | WIDTH 3          |
| 4  | WIDTH 4          |
| 5  |                  |

FIG. 8(d)

| ID | TRACE LUMINANCE |
|----|-----------------|
| 1  | LUMINANCE 1     |
| 2  | LUMINANCE 2     |
| 3  | LUMINANCE 3     |
| 4  | LUMINANCE 4     |
| 5  |                 |

FIG. 8(e)

| ID | TRACE LUMINANCE VARYING CYCLE |
|----|-------------------------------|
| 1  | CYCLE 1                       |
| 2  | CYCLE 2                       |
| 3  | CYCLE 3                       |
| 4  | CYCLE 4                       |
| 5  |                               |

FIG. 9(a)

| CURSOR ID | PAGE $P_1$ | PAGE $P_2$ | PAGE $P_n$ |
|---|---|---|---|
| $CS_1$ | 1 | 0 | 0 |
| $CS_2$ | 1 | 1 | 1 |
| $CS_3$ | 0 | 1 | 0 |
| $CS_4$ | 0 | 0 | 1 |
| $CS_m$ | 1 | 1 | 0 |

FIG. 9(b)

| PAGE ID | LEFT-UPPER EDGE POINT OF POSSIBLE MOVEMENT AREA | | RIGHT-LOWER EDGE POINT OF POSSIBLE MOVEMENT AREA | |
|---|---|---|---|---|
| | X-COORDINATE | Y-COORDINATE | X-COORDINATE | Y-COORDINATE |
| $P_1$ | | | | |
| $P_2$ | | | | |
| $P_p$ | | | | |

FIG. 10(a)
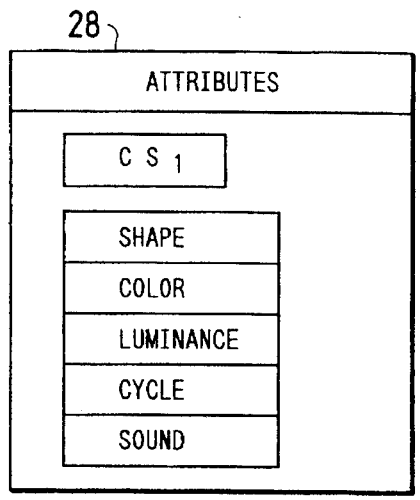
FIG. 10(b)
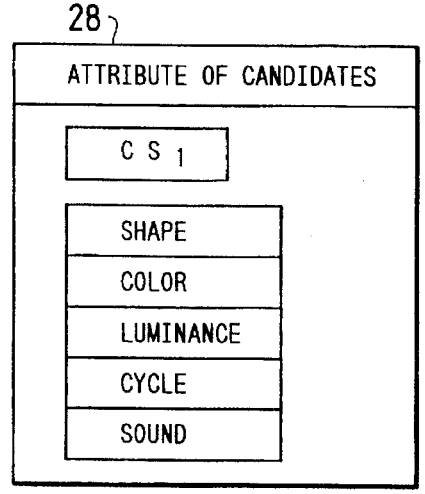
FIG. 10(c)
| CURSOR ID | SHAPE | COLOR | LUMINANCE | TRACE | | RANGE OF MOVEMENT |
|---|---|---|---|---|---|---|
| $CS_1$ | 1 | 1 | 2 | 0 | | $P_1, P_2$ |
| $CS_2$ | 2 | 1 | 2 | 0 | | all |
| $CS_3$ | 1 | 2 | 2 | 0 | | $P_3$ |
| $CS_4$ | 0 | 0 | 0 | 0 | | 0 |
| $CS_m$ | 1 | 4 | 1 | 1 | | all |

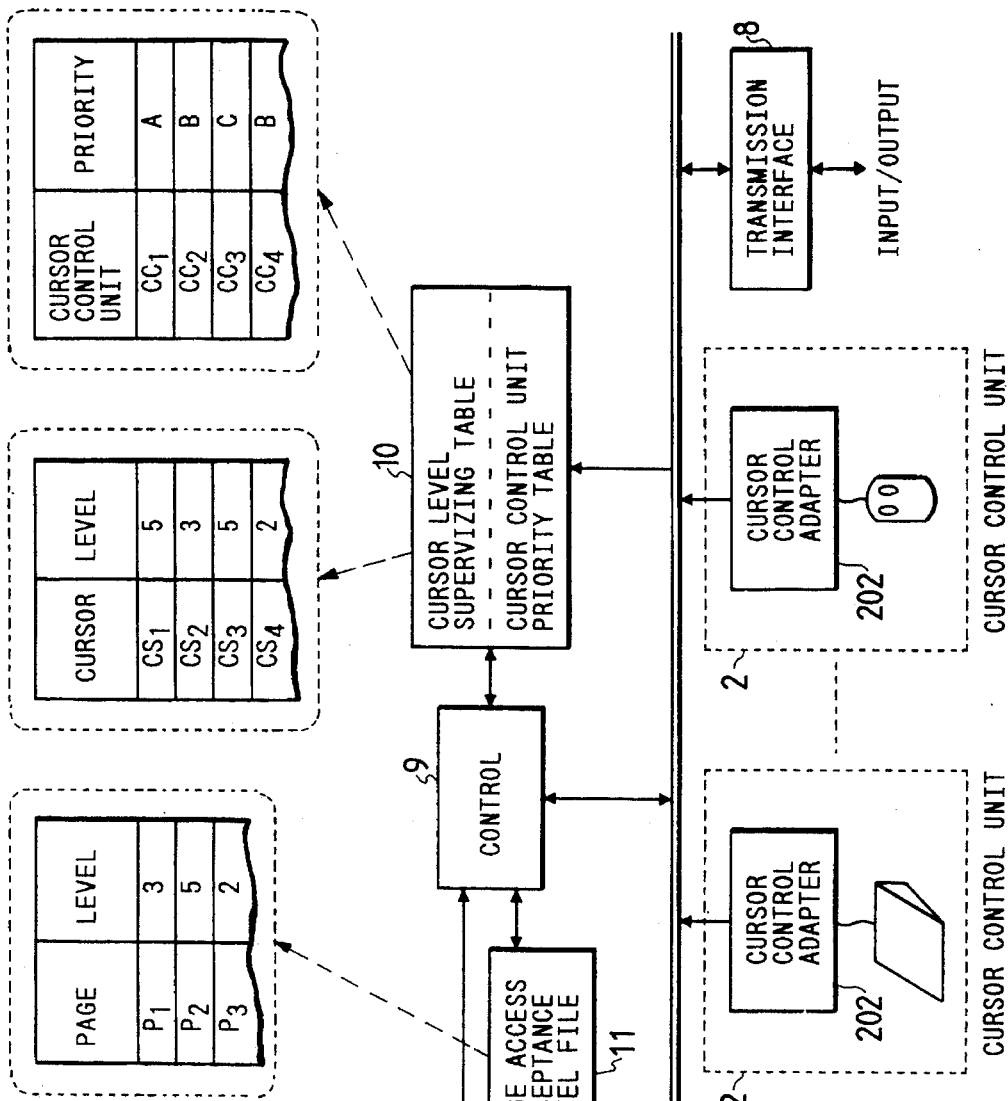

(AAL)

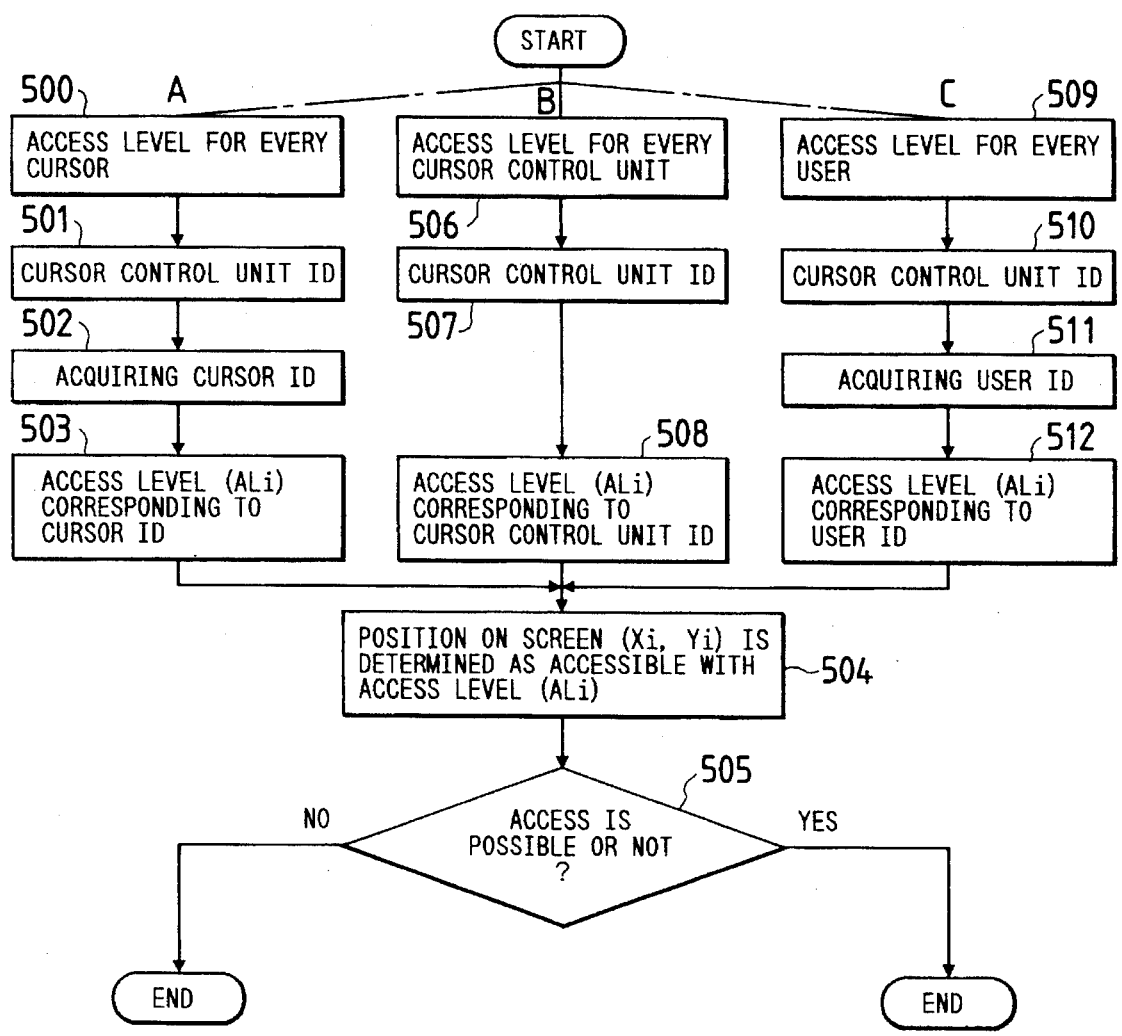

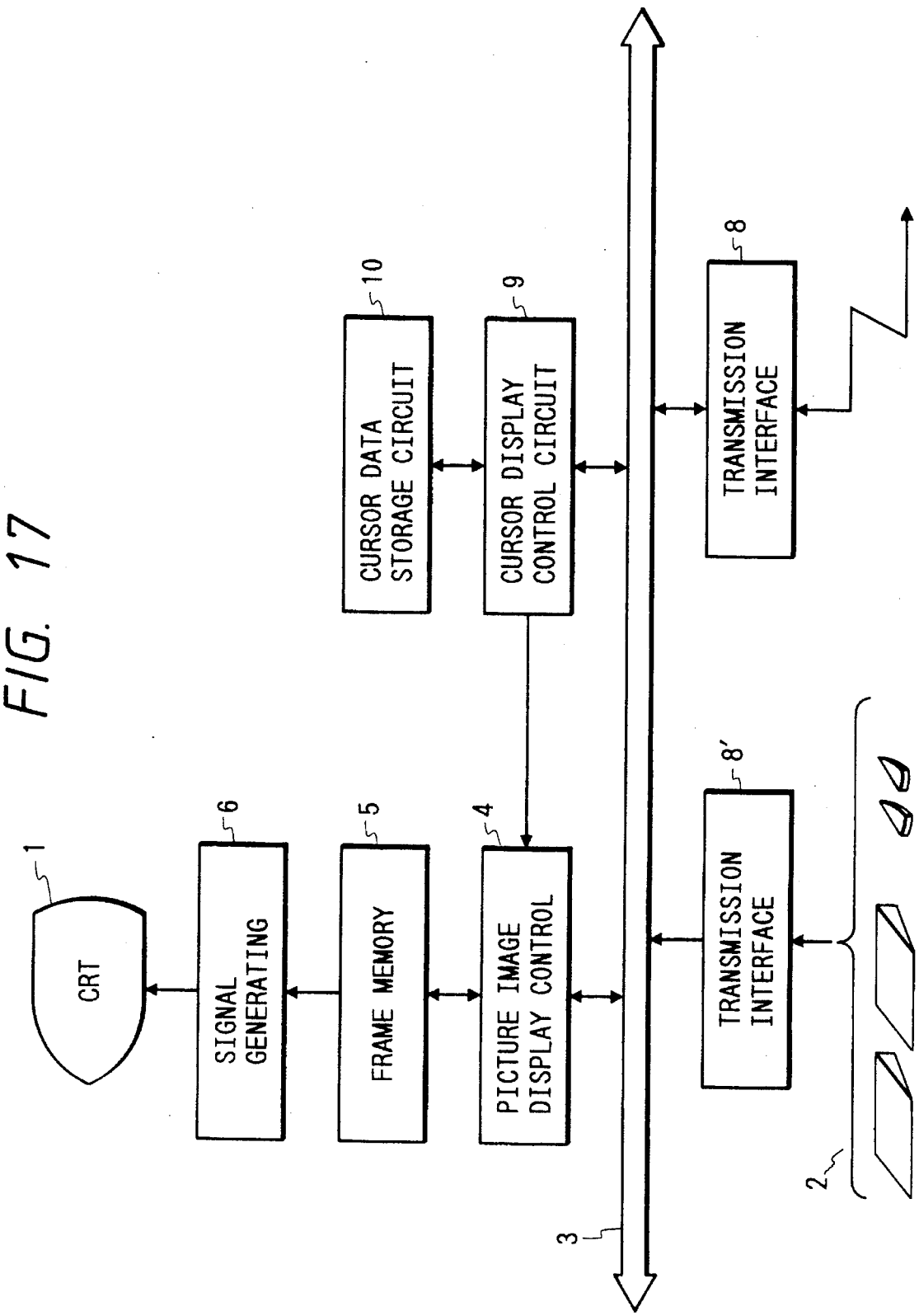

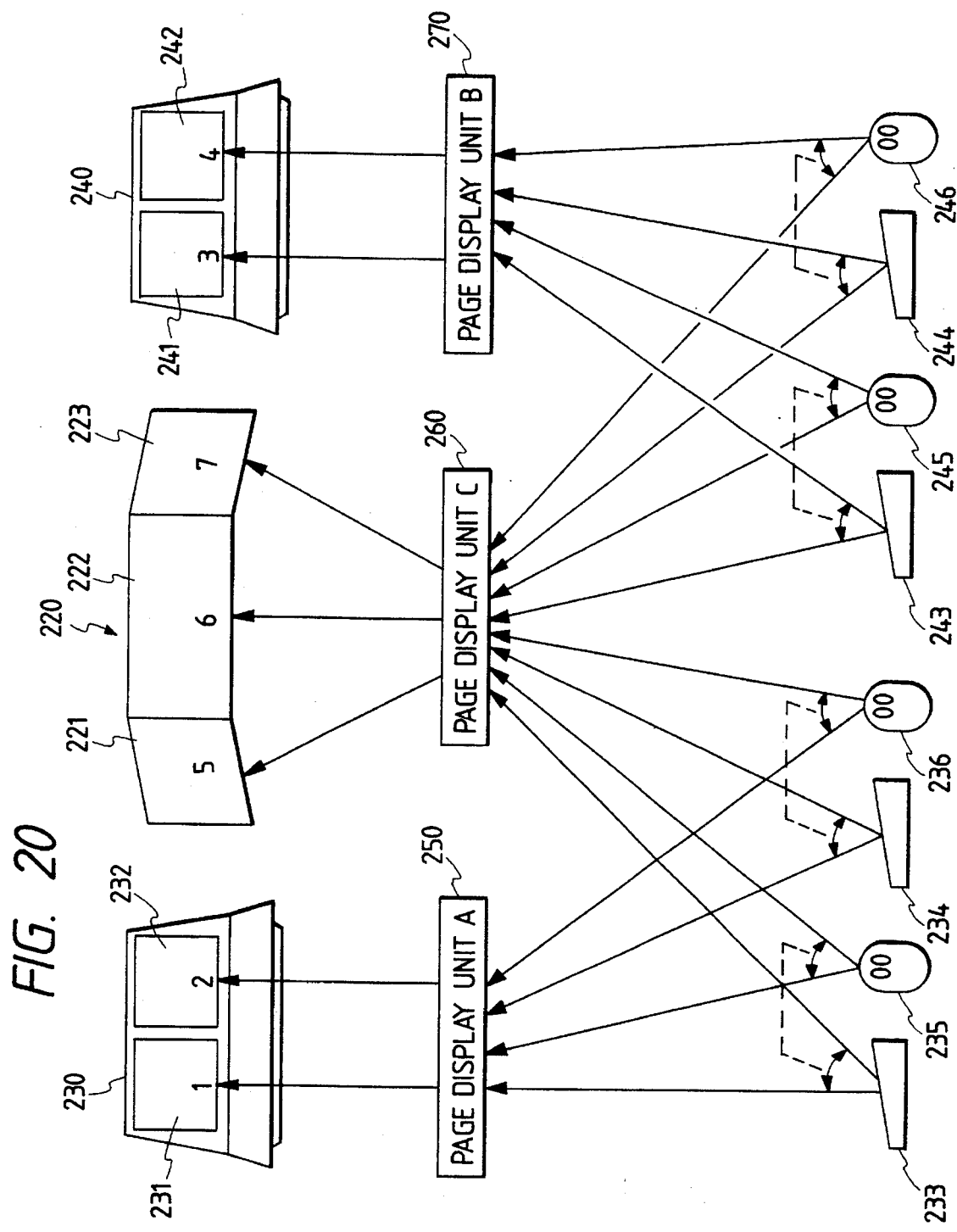

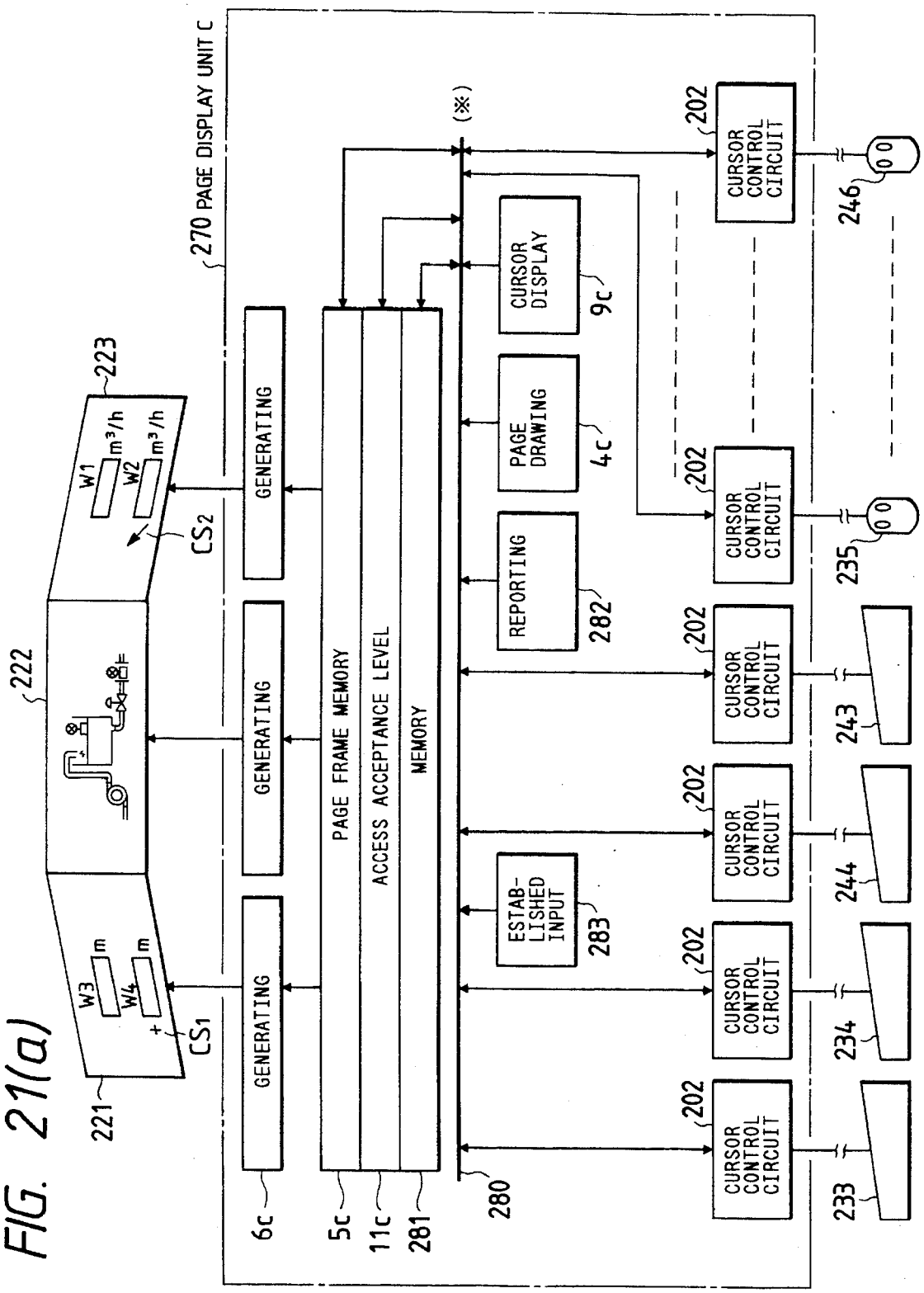

FIG. 22

| MONITORING TABLE | MONITORING TABLE A (TASK OF MONITORING AND ADJUSTING WATER LEVEL) | | MONITORING TABLE B (TASK OF MONITORING AND ADJUSTING FLOW RATE) | |
|---|---|---|---|---|
| OPERATOR | OPERATOR a (MOUSE 1) | OPERATOR b (MOUSE 2) | OPERATOR c (MOUSE 3) | OPERATOR d (MOUSE 4) |
| STATUS | MEMBER ON DUTY | CHIEF MEMBER ON DUTY | MEMBER ON DUTY | SUBCHIEF MEMBER ON DUTY |
| CONTENT OF TASK | MONITORING WATER LEVEL, EXECUTE MONITORING FLOW RATE FOR ANOTHER, NOT ALLOWED TO DECIDE OBJECT VALUE | DECIDING WATER LEVEL, DECIDING FLOW RATE FOR ANOTHER, ALLOWED TO HOLD MONITORING TASK | MONITORING FLOW RATE, EXECUTE MONITORING WATER LEVEL FOR ANOTHER, NOT DECIDING OBJECT VALUE | DECIDING OBJECT FLOW RATE, DECIDING WATER LEVEL FOR ANOTHER, ALLOWED TO HOLD MONITORING TASK |
| ACCESS LEVEL | 1 | 2 | 1 | 2 |
| PRIORITY FOR ACQUIRING CURSOR | 3 | 1 | 4 | 2 |
| SIMULATED SCENE | ($t_1$) START OF MONITORING OPERATION OF WATER VALVE<br><br>($t_3$) SUBCHIEF MEMBER ON DUTY (d) STARTS DECIDING WATER LEVEL SO CURSOR FOR MONITORING WATER LEVEL IS SEIZED<br><br>($t_9$) CHIEF (b) TAKES MOUSE OFF, MONITORING WATER LEVEL, MONITORING OPERATION OF WATER LEVEL<br><br>($t_{11}$) END OF MONITORING OPERATION OF WATER LEVEL, TAKES MOUSE OFF | ($t_5$) NOTE ERRONEOUS PRESET OF WATER LEVEL BY SUBCHIEF SO SEIZE POWER OF DECIDING OPERATION<br><br>($t_9$) END OF DECIDING OPERATION OF WATER LEVEL, TAKES MOUSE OFF | ($t_2$) START OF MONITORING OPERATION OF FLOW RATE<br><br>($t_4$) END OF MONITORING OPERATIONS OF FLOW RATE<br><br>($t_8$) INTENDS TO START OPERATION OF MONITORING FLOW RATE, BUT CURSOR FOR MONITORING FLOW RATE IS USED BY SUBCHIEF (d) SO WAITS<br><br>($t_{10}$) SUBCHIEF (d) TAKES MOUSE OFF, SO ACQUIRES CURSOR FOR MONITORING FLOW RATE, STARTS MONITORING OPERATION OF FLOW RATE | ($t_3$) STARTS DECIDING WATER LEVEL (BY MISTAKE)<br><br>($t_6$) NOTE ERRONEOUS PRESET OWING TO INTERRUPT BY CHIEF MEMBER ON DUTY (b) SO CEASES<br><br>($t_7$) STARTS PROPER TASK OF DECIDING FLOW RATE<br><br>($t_{10}$) END OF DECIDING OPERATION OF FLOW RATE, TAKES MOUSE OFF |

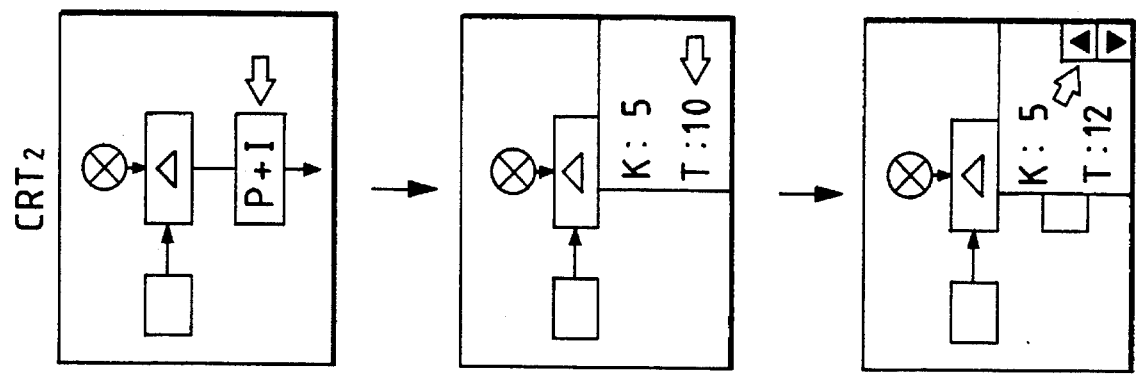
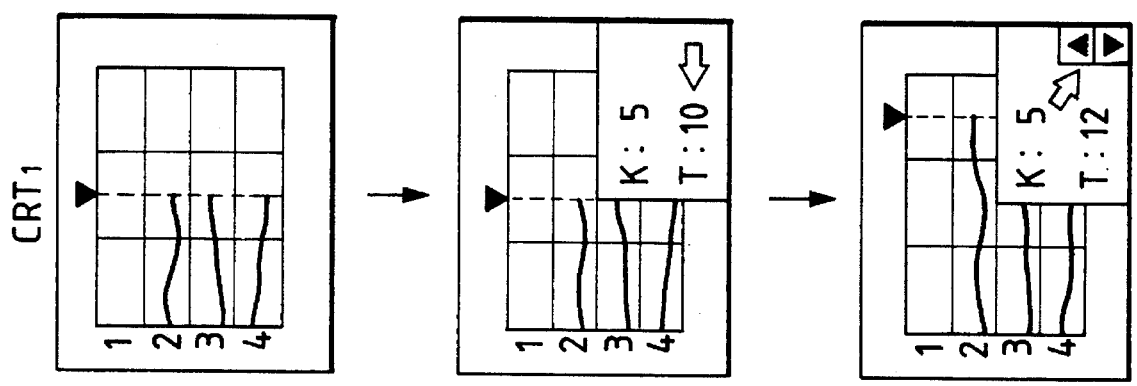
FIG. 24(a)   FIG. 24(b)   FIG. 24(c)

METHOD AND APPARATUS FOR SCREEN DISPLAYING

BACKGROUND OF THE INVENTION

The present invention relates to cursor control on a display, particularly a screen or image display.

In controlling a plant, a number of monitors are disposed in a centralized or a decentralized manner. Each operator for the monitors watches at least one monitor, for example a CRT screen, and the operators communicate with each other. However, it often occurs that an appropriate and immediate operation is needed by one skillful operator based on judgments made by a plurality of operators, depending upon the behavior of the process in the plant.

A method for displaying a plurality of cursors on a single screen is disclosed in Japanese Patent Application Kokai (Laid-Open) No. 63-306491 (1988, particularly FIG. 17). According to this publication, a plurality of cursors are displayed on a common display screen, and one of these cursors can be selected at will by means of one input unit, so that that is cursor control unit, the location of input data can be indicated on the display screen. Thus, an individual cursor can be used at each entry area on a screen, or an individual cursor can be selectively used by selecting the corresponding one of a plurality of input units.

SUMMARY

It is an object of the present invention to overcome disadvantages with respect to the prior art.

More particularly, with respect to the above-mentioned plant operation, it may be desired to have one skillful operator take over control, for example by interrupting the cursor indication on a monitor by another operator or by simultaneously accessing the cursor of the other operator or each operator, for example on one large screen for common monitoring.

While CAI, Computer Aided Instruction, systems are known in the field of education wherein the instructor and pupils have common access to a large visual display corresponding to a blackboard, it is an object of the present invention to provide the instructor with a higher priority to dominate access by the pupils to the common display.

With respect to Japanese Patent Application Kokai No. 63-306491, relationships among the plurality of cursors or relationships between the plurality of cursors and the plurality of cursor control units have not been established, so that methodical or controlled operations cannot be made when a plurality of operators simultaneously seek access through their respective cursors.

In general, cursors not only indicate a location on a display, for example screen, but also symbolize the power of the access on the screen and the various control modes of displaying on the screen, such as entry or change of information, enlargement, reduction or exchange of images on the screen. It is known to use icons for the cursor to indicate the type of control that is being conducted at the location of the cursor. When a plurality of such cursors are displayed on a screen and an attempt is made for simultaneous access of more than one such cursor, confusion can result, and the need for the cursors to be fully functional may not be satisfied.

While it is known to employ cursors that may have different colors, there is no recognition of providing different visual attributes to the cursors such as different shapes, luminance, cycles of varying luminance, traces of movement or movement velocities, or applying attributes of ability as ranges of movement of cursors or access levels resolving problems relating to allowing a plurality of cursors to function when simultaneously accessed for the same screen or system.

In the case of common use of a plurality of cursors by a plurality of cursor control units, there has been no regard for the mutual relationships between the cursors or with regard to the different processing abilities of the cursors or access levels in the event of conflicting access, for example simultaneous access of a plurality of the cursors with respect to information in a common system, for example a common screen.

Therefore, it is seen that there are many problems, recognized by the inventors, to be solved with respect to simultaneously accessing or otherwise conflictingly operating a plurality of cursors by a plurality of users of a common system, for example a common display screen.

It is an object of the present invention to provide for screen display with a plurality of cursors with simultaneous requested access or conflicting requested access to be controlled so that access can be selectively given according to cursor hierarchy, for example according to various attributes assigned to the cursors to enhance visibility and operability for the users, to solve the above-mentioned problems.

Another object of the invention is to provide a common system, for example a screen display, with a plurality of individual controls, for example cursors, that are related exclusively to corresponding individual cursor control units that have different accessibilities of the cursors or access levels, together with a system to maintain order in the event of simultaneous or other conflicting requested accesses through the cursors by, for example, a plurality of operators.

The control determines the exclusive relationships between M (capital M equals an integer from 1 to m) cursor control units which control the cursors to access or relay information on the screen, and N (capital N is an integer from 1 to n) cursors, which can be displayed on the screen, and further with the powers of control corresponding to particular cursors according to a priority defined with respect to their cursor control units, respectively. The cursor control units are provided with levels of access to the screen, and with respect to specific cursors; access acceptance levels are defined for the information or areas on the screen. The access of the cursors is individually within the allowable range of the access acceptance levels.

With a plurality of cursors on the screen that are controlled by a plurality of cursor control units, simultaneous addresses can be made on the screen by the plurality of cursors. Various visual attributes, for example shapes, colors, luminance, traces, or attributes of ability, for example range of movement, access levels, etc. can be given to each cursor, individually or in combination. The attributes are preliminarily defined for the cursors in a fixed manner or defined by a command from input units. The interrelationships between individual cursors and between individual cursor control units are established preliminarily in a fixed manner, or established automatically and exclusively, for example according to the order of entry, and in each case they may be changed. When conflicts occur among cursor control units for a particular cursor, the power of the cursor control is shifted according to the priority order defined in the cursor control units.

The access level grades the information on the screen or grades the contents of the access for control on the screen display and is defined for each cursor, so that each cursor executes an access according to its level. When different accesses are requested for a plurality of cursors for the same information on the screen, the access of a higher level is executed with priority. Access acceptance levels are defined corresponding to the displayed positions of the information or areas displayed on the screen. Only the accesses of the cursors with access levels within the allowable range of the acceptance level are permitted, and access of the cursors out of the allowable range of the access acceptance level are neglected.

Access on one screen by a plurality of cursors that are controlled by a plurality of operators are put into order without confusion according to the ranks of priority of the cursor control units or according to the access levels of the cursor. Particularly, with the ranks of priority or access levels, the control with priority can be assured owing to the ranks or skillfulness of the operators, and the damage to the image information due to mistakes by the operators of lower ranks can be prevented, for example.

BRIEF SUMMARY OF THE DRAWING

Further objects, features and advantages of the present invention will become more clear from the following Detailed Description of a Preferred Embodiment, as shown in the accompanying drawing, wherein:

FIG. 3 shows the data structure relating the cursor control units with the users;

FIG. 4 shows the data structure relating the cursor control units to the cursors;

FIG. 5 shows the data structure for supervising the power of cursor control waiting;

FIG. 6 shows the data structure supervising buffer space for cursor position;

FIGS. 7A through 7E show examples of visual attributes of cursors;

FIGS. 8A through 8E show examples of visual attributes of cursors;

FIG. 9(a) is a table for managing the range of movement of cursors;

FIG. 9(b) is a table storing the coordinates for the range of movements;

FIGS. 10(a) through 10(c) define cursor attributes;

FIG. 11 illustrates the embodiment, in more detail, which is further described with respect to FIGS. 12–14;

FIG. 13 is a flow chart showing processing based on access levels;

FIG. 17 shows an analysis of the construction of a conventional page displaying control;

FIG. 20 shows relationship among page display units, input devices and screens in the plant;

FIG. 21(a) shows the construction of a page display unit from the plant;

FIG. 22 is a table showing the operation of different operators at different monitoring tables;

FIGS. 24(a) through 24(c) show examples of the display for the system of FIG. 23.

DETAILED DESCRIPTION OF A PREFERRED EMBODIMENT

Figure 1:
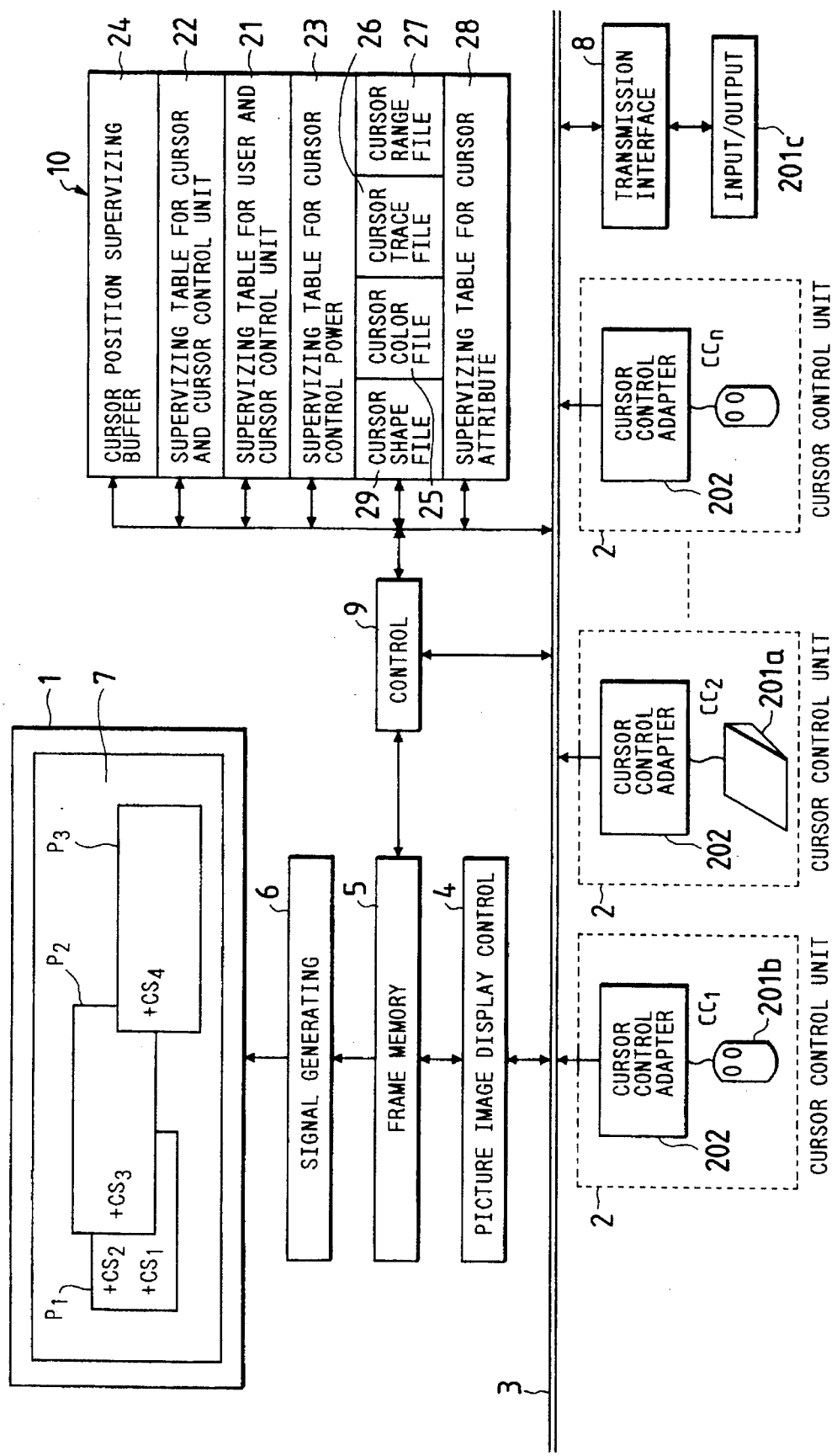
FIG. 1 shows an embodiment of the present invention, as a whole, disclosed in further detail with respect to FIGS. 2–10.

In FIG. 1, a plurality of cursors $CS_1$–$CS_4$ are displayed on a screen 7 of a display device 1 for moving under the control of an electrical signal from cursor control units 2 or from an outside source. A frame memory 5 stores picture image information in picture element units, or pixels, from an image display control circuit 4 or from a cursor display control circuit 9. The frame memory 5 has sufficient storage capacity for a plurality of frames in the case of a multi-window display comprising a plurality of windows or pages $P_1$–$P_3$. A screen image signal generating circuit 6 generates screen image signals from the data in the frame memory 5 and delivers the same to the picture image display 1.

A cursor display control circuit 9 executes the picture drawing process for a plurality of the cursors, that is provides information for movement of the cursors and delivers this to the frame memory 5. A cursor data storage unit 10 supervises the display and motions of the cursors. The picture image display control circuit 3 functions as a bus for picture image display data.

The cursor data storage unit stores a plurality of attributes, for example: a supervising table 21 for relating a plurality of users with a plurality of cursor control units 2; a supervising table 22 for relating a plurality of cursors CS and a plurality of cursor control units 2; a supervising table 23 for relating either cursors CS or cursor control units 2 with cursor control power, such as enlargement; a buffer 24 for supervising the position of a cursor CS to be continually renewed and to store the coordinates of each of the cursors on the screen or within a particular page or window as operated by the control circuit 9; a file 25 of color attributes assigned to different cursors; a file 26 of traces that are assigned to different cursors; a file 27 for assigning different ranges to the cursors; a supervising table 28 for assigning different cursor attributes to the cursors; and a file 29 for assigning different cursor shapes to the cursors. The assignment of attributes to specific cursors within the tables and files mentioned above may be determined at the factory, determined by the user, dynamically determined as cursors are activated, or one or more combinations of these. The cursor control units 2 constitute input devices for cursor control information, and may take different forms, with each having a cursor control adapter 202, which have logical assignments of $CC_1, CC_2 \ldots CC_n$. Each cursory control unit 2 also includes a user input, for example mouse 201, keyboard 201a, or a light pen (not shown). Each of the cursor control units 2 sends information necessary for determining the positions of the cursors, information necessary for determining the amount of movement and the direction of movement, and functions of the cursors to the cursor display control circuit 9 through the cursor control adapter 202 that forms an interface with the same. Also, any type of input/output device can act as a cursor control unit, for example a transmission interface 8 may provide the interface for entry of picture image information or cursor display control information from an input/output device 201c, which may be, for example, an external computer. Also, the transmission interface 8 may function to link the external computer as the input/output device 201c to the picture image display control circuit 3 or bus, to transmit information from the bus to the external computer as the input/output device 201c.

Figure 2:
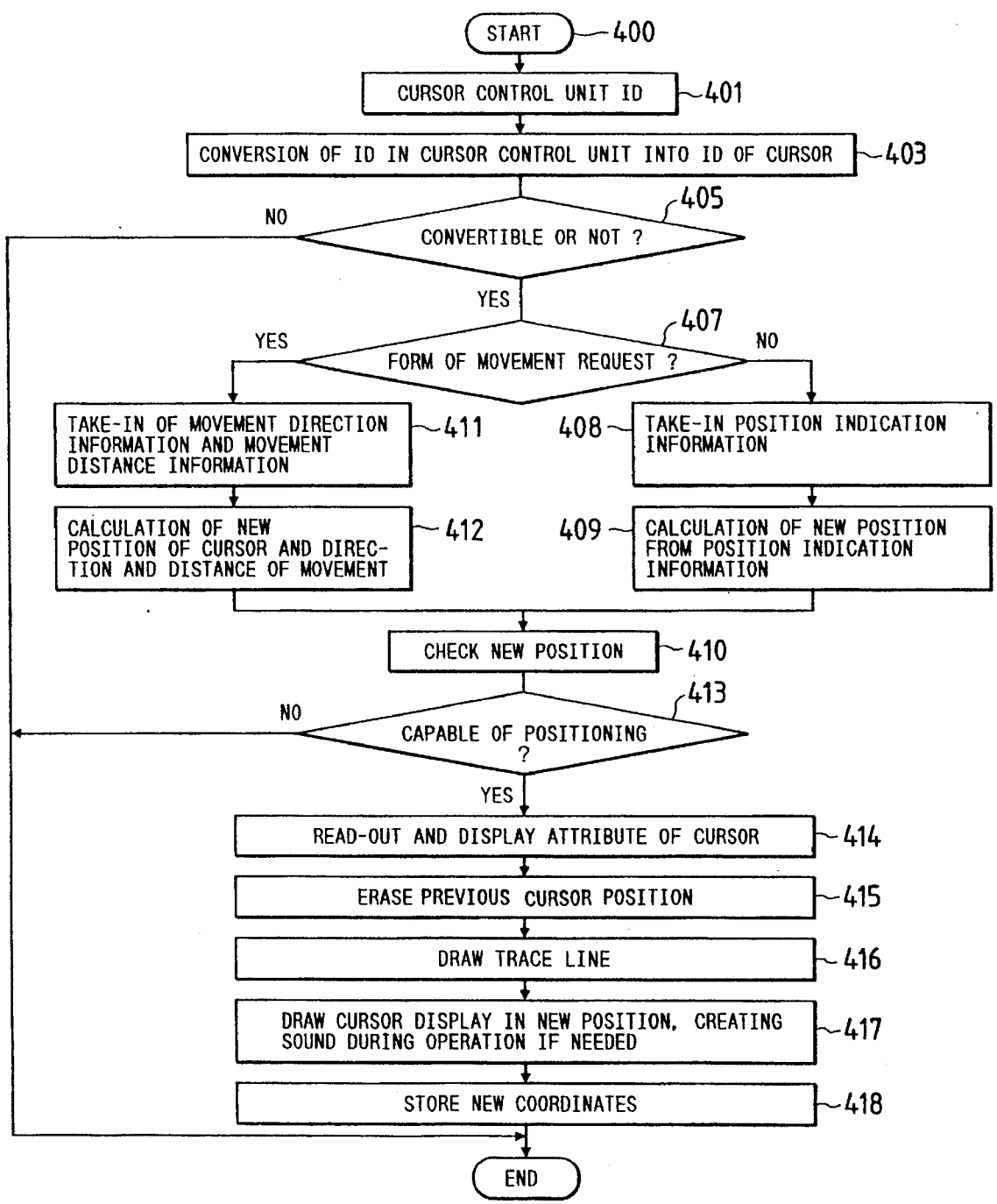
FIG. 2 is a flow chart showing the processing for movement of the cursor.

In FIG. 2, the processing provided for controlling movement of the cursors is shown. In step 400, the process starts with a control signal. The cursor control unit 2 is identified in step 401 as requesting access. An interrupt is generated to stop the processing, for example of a microcomputer, and control of the passing of information to the cursor picture image display control circuit from the cursor control unit adapter 202 that is requesting access. The identification of the cursor control unit 2 requesting access from step 401 is converted in step 403 into a unique identification of the requested cursor to distinguish it from all of the other cursors on the screen 7, which step 403 searches table 22 from cursor data storage unit 10 to determine the concordance of the cursor assignments to different cursor control units already made. Based upon this information, a decision is made in step 405 as to whether or not the cursor control unit identified is convertible into a cursor identification, which decision is based upon the reference information from step 405 that conversion is not allowed when the cursor control unit does not control or is not permitted to control the requested cursor.

If the answer to the decision in step 405 is no, processing proceeds to the end. If the answer is yes in step 405, processing proceeds for the designation of direction and distance of movement for the identified cursor. In step 407, a decision is made as to whether there is a form of movement request. If the answer is no, step 408 will take in the position indication information from the cursor control unit adapter 202 of the requesting cursor control unit 2 so that in step 409 a new position of the accessed and now identified cursor may be calculated from the position indication information from step 408 and then processing proceeds to step 410. If the answer to the decision in step 407 is yes indicating that there is a form of movement request, processing proceeds to step 411 to take in information as to the movement direction and movement distance requested by the cursor control unit that has accessed the identified cursor. In step 412 the information from step 411 is used to calculate a new position of the cursor and the direction and distance of movement necessary to reach the new position on the screen 7, and thereafter control is passed to step 410.

In step 410, the information from either step 412 or step 409 is checked against reference information, for example to determine whether the new position extends outside of the screen so that it is not allowed, or whether the new position takes the cursor outside of its range of movement as determined from file 27.

In step 413, based upon the checking of step 410, the decision is made as to whether the screen is capable of positioning the cursor at the new location, that is whether the new location is allowable. If the answer is no, processing proceeds to the end, but if the answer is yes, processing proceeds to step 414 where the cursor identification is matched with an attribute from the cursor data storage unit 10, for example a shape is assigned to the cursor and the cursor is displayed on the screen 7 with the assigned attributes. Next, in step 415, the previous position of the cursor is erased from the screen and erased from the page or frame memory 5. Next, in step 416, a trace is drawn connecting the previous position and the new position using the trace from the file 26 if a trace is needed. In step 417, the cursor is drawn in the new position. If desired, a sound may be issued to the user to indicate the new position has been obtained. The new position is stored in the frame memory 5 along with the shape and other attributes of the display. The sound is obtained from a sound assignment table or file as a part of the cursor data storage unit 10, to be described.

In step 418, the coordinates of the new position on the screen 7 are stored in correspondence with the cursor identification in the cursor position supervising buffer 24 and if needed the coordinates are also stored in the frame memory 5.

FIGS. 3-10 show the data structures for the respective parts of the cursor data storage unit 10.

In FIG. 3, there is an example of the data structure coordinating the user identification with a cursor control unit identification for table 21. Cursor control units $CC_1 \ldots CC_n$ are stored as codes for identification of each of the plurality of control units 2, by which their relationship with the identifications $U_1 \ldots U_n$ of the plurality of users are established. When there is no use, a zero occurs in the table 21 to denote that that particular control unit is not being used. The identification of the users is not necessarily required if the control unit is indicated as being used or not used, but there is an advantage in identifying the user when the powers or priority assigned to the cursor control units or different access levels assigned to the cursor control units are changed according to the particular user. Users could be identified by passwords or the like.

In FIG. 4, there is shown the supervising or management table for coordinating the cursor identification $CS_1 \ldots CS_m$ with the identification of the cursor control units. As seen in table 23, a plurality of cursor control units may be assigned to the same cursor, and they are indicated in the table according to their order of priority. The priority order is such that order 1 is the highest priority and if the cursor control unit in order 1 requests access to the cursor, it will be granted access in preference over other cursor control units. For example, if cursor control unit $CC_9$ and cursor control unit $CC_{21}$ simultaneously request access to cursor $CS_1$, cursor control unit $CC_9$ having the highest order of priority will be granted access in accordance with the wait for cursor control priority. The order of the cursor control units may be established according to the order of their request, or in advance at the factory or upon setup of the software, or by external information, for example. This is determined by the cursor display control circuit 9. When the number of cursors m and the number of cursor control units n are related such that n is less than m, with all the cursors used, there is a possibility of the occurrence of a wait for cursor, that is there is a conflict between access requests, and upon such conflict the above-mentioned priority will establish which cursor control unit will eventually control the cursor, which may include an interrupt of the cursor control unit currently controlling the cursor with lower priority. A plurality of cursors may be controlled at the same time, and when there are cursors having no cursor control units waiting for their use, the power of control may be supervised so that all the cursors are joined together, instead of supervising each cursor.

FIG. 6 shows an example of the data structure in the cursor position supervising buffer 24. The position of each cursor is calculated and stored in the buffer according to the coordinates on the screen, that is $X_1 \ldots X_N$ and $Y_1 \ldots Y_N$, and also stored according to the coordinates on the pages $P_1 \ldots$ with such page coordinates being indicated $PX_1 \ldots PX_N$ and $PY_1 \ldots PY_N$. The coordinates are calculated, transposed and otherwise handled in the cursor display control circuit 9. A command for movement of the cursor may be made by dragging the cursor on the screen for entry of the amount and direction of movement, for example, and supervision of the former position and the new position is accomplished for each of the cursors.

FIGS. 7–10 show example contents or data stored as the attributes of the cursors. The identification number may correspond to the cursor identification preferably or else correspond to, for example the cursor control unit identification. FIGS. 7 and 8 show examples of visual attributes of the cursors. FIG. 7a shows the data structure for assigning specific shapes to the cursors. The shape of the cursor is used for the proper display of the cursor on the screen, and in this example shape is stored in a file separate from other files to make supervision convenient, that is so that the shapes may be changed as mentioned previously. Such is true of all the attributes. The attributes may be initially defined or fixed with respective identifications, for example identifications of the cursor, by the cursor display control circuit 9. FIG. 7b assigns different colors to the respective cursors. FIG. 7c assigns a luminance value, for example an intensity of the color or a brightness of the color to the cursors. FIG. 7d assigns cycles of luminance to the cursors, for example flashing frequency. FIG. 7e assigns sounds to the cursors that will issue audibly to the user during movement or other usage of the cursors. Although not specifically indicated in FIG. 1, the files of FIGS. 7c–7e are contained within the cursor data storage unit 10.

The information shown by way of example, in the files of FIGS. 8(a)–8(e) is all contained within the cursor trace file 26 of FIG. 1. FIG. 8(a) assigns each cursor a kind of trace line, for example a solid line or a dotted line to indicate the trace movement. FIG. 8(b) assigns a color to the trace for each cursor. FIG. 8(c) shows the file that assigns the line width of the trace for each cursor. FIG. 8(d) shows the file that assigns the luminance value for the trace of each cursor. FIG. 8(e) shows the file that assigns the cycle of varying luminance to the trace of each cursor. The information of these files establishes the data for the respective cursors through the cursor display control circuit 9, which transforms the stored data format into and out of the electrical format needed to control the screen based upon a suitable command from the corresponding cursor control unit 2. At startup, standard or default data may be established, but this may be changed by the user or dynamically according to usage.

FIG. 9(a) shows an example of data in a table 27a that is a part of the cursor trace file 26 and cursor range file 27, respectively, of FIG. 1. In FIG. 9(a) each cursor is assigned permissible pages, or windows, $P_1 \ldots P_N$, with the numeral 1 indicating that the cursor is permitted to be displayed in the page and the numeral 0 indicating that the cursor is not permitted to be displayed or moved into the page.

In FIG. 9(b) the structure of file 27 is such that, for each page, there is stored the range of movement, in the form of coordinates, that are permissible for each cursor or for each cursor control unit, when used in combination with the information of FIG. 9(a). The stored coordinates show the possible movement area on the indicated page.

FIG. 10 provides a definition of the attributes for each cursor as defined by the cursor display control circuit 9. Again, the attributes may be for each cursor or for each cursor control unit 2, or for each particular user, although cursors are specifically illustrated. In FIG. 10(a) the attributes of cursor $CS_1$, as they would be brought up and displayed on the screen 7 are shown in window format in accordance with the supervising table for cursor attributes 28 of FIG. 1. Basically the same window is shown in FIG. 10(b), but when used to display information on the screen with respect to the attributes of the cursor, for example, whose access is requested but has not yet been identified according to steps 401, 403 of FIG. 2, that is for a candidate. FIG. 10(c) shows the supervising table 28 for the cursors, with numerical values being given to identify specific attributes.

The cursor display control circuit 9 executes the operation of the cursor as displayed on the screen 7, particularly the coordinates on the screen and executes the definition of the display attributes (such as the shape of the cursor) according to the information from the cursor control unit 2 or externally provided and depicts the image in the frame memory 5 corresponding to the coordinates by the use of the display attributes and other information of the cursor data storage unit 10.

A plurality of cursors can be displayed on the same screen and various data can be provided for the different cursors to define their attributes, such as shape, color, luminance, trace, range of movement, etc., as noted above. Accordingly, each cursor can be provided with an arbitrary combination of attributes corresponding to the cursor control unit for the purpose of facilitating the processing and identification by the user or other users in identifying the powers, functions and users of other cursors on the screen. The display of the attributes is visual to provide for good operability.

Since the interrelationship between each cursor and each cursor control unit can be controlled exclusively on the same screen by a plurality of users, the likelihood of confusion is lessened.

Much of the structure shown in FIG. 1 is conventional, for example as shown in FIG. 17, which is the inventors' interpretation of the structure shown in the above-mentioned Japanese Patent Application Kokai No. 63-306491, where like numerals apply. It is noted in FIG. 17 that the plurality of cursor control units 2 cannot simultaneously access the bus 3, but must serially pass through the translation interface, particularly cursor control adapter 285.

While the structure shown and described with respect to FIG. 1 operates satisfactorily, in its elemental form explained so far, additional features of the preferred embodiment are shown in FIG. 11(a), with further examples of files and data being shown in FIGS. 11(b)–11(d). In addition to the structure shown in FIG. 1, FIG. 11(a) shows a page access acceptance level supervising file 11 that interacts as shown by the arrows, with the cursor display control circuit 9 and each of the frame memory 5 and the picture image display control circuit 4. An example of the data kept in the file 11 is shown in FIG. 11(b), wherein there is established a correspondence between each page and an acceptance level value or priority assigned to each page. In addition to the contents previously described with respect to cursor data storage unit 10, as shown in FIGS. 11(c) and 11(d), unit 10 may additionally contain a correspondence between each cursor and its acceptance level and a correspondence between each cursor control unit and its priority, respectively as the cursor level supervising table and the cursor control unit priority table, which define and supervise the access levels of the cursor for picture image information for each cursor. The access levels are arbitrarily defined by several steps of levels corresponding to the rank of importance in the processing, for example entry of information, rewriting of information, or control of screens, and they begin with a low level for mere indication of information, whereas a higher level would actually change such information. This allows the processing abilities of a plurality of cursors to be differentiated, and also allows the access of the plurality of cursors on the same screen to be controlled without confusion based on the relationships of the cursors and cursor control units as set forth in FIGS. 11(a)–11(d).

The page access acceptance level supervising file 11 defines page access acceptance levels for each page on the screen, as shown in FIG. 11(b). Such levels are either defined in a fixed manner on the page or picture image display circuit 4 or defined each time of access based on the entry command. The access level of each cursor and the access acceptance level of each page are compared in the cursor display control circuit 9, and the access of the cursor is possible only when the cursor access level is no less than the page access acceptance level. According to this, the cursors are controlled in an orderly manner by the access of a plurality of users and the information on the screen is prevented from becoming disordered, corrupted or changed in an undesired or unallowed manner.

Figure 12A:
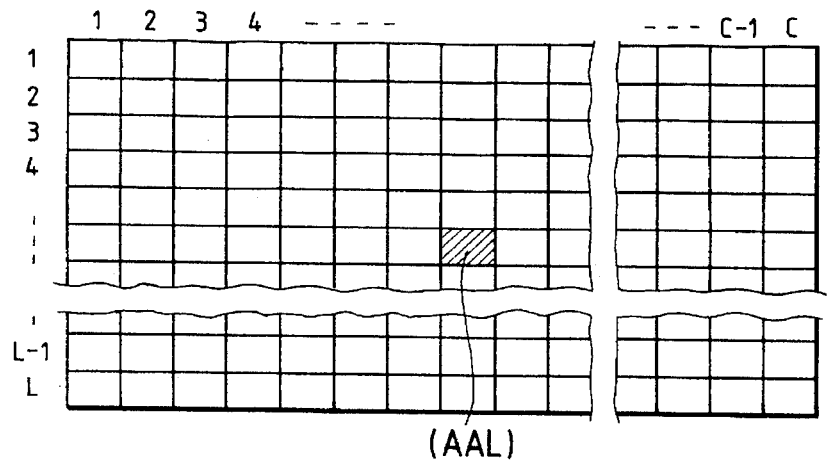
FIGS. 12(a) through 12(c) show the data structure in the supervising file for access acceptance levels.
Figure 12B:
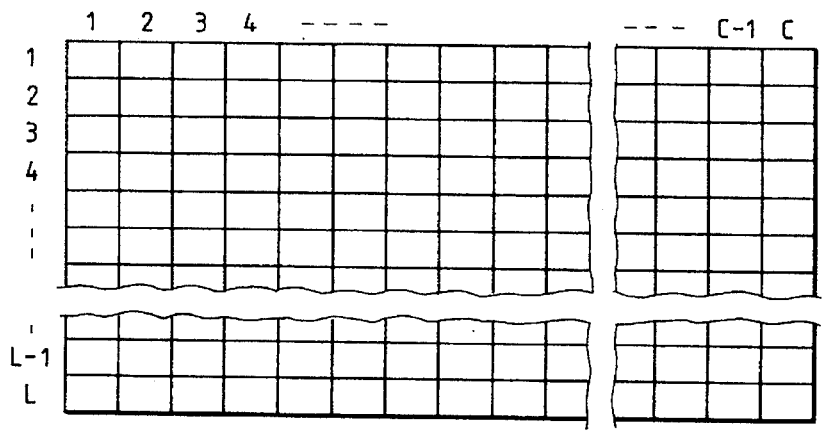
Figure 12C:
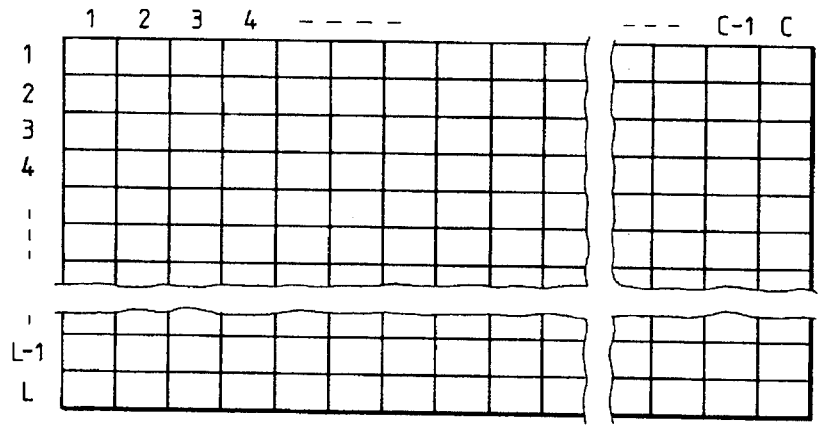

Each page may be subdivided as shown in FIGS. 12(a)–12(c). Such information would be maintained in the cursor data storage unit. In FIG. 12(a) the subdivision and access levels for page $P_1$ are shown, whereas corresponding information for pages $P_2 \ldots P_p$ are shown in FIG. 12(b) ... 12(C), respectively. In each of these figures, the page is subdivided according to column 1 . . . C and rows 1 . . . L. Thus, a grid is formed and the access acceptance level AAL, for each block in the grid, can be indicated in the file.

Figure 14:
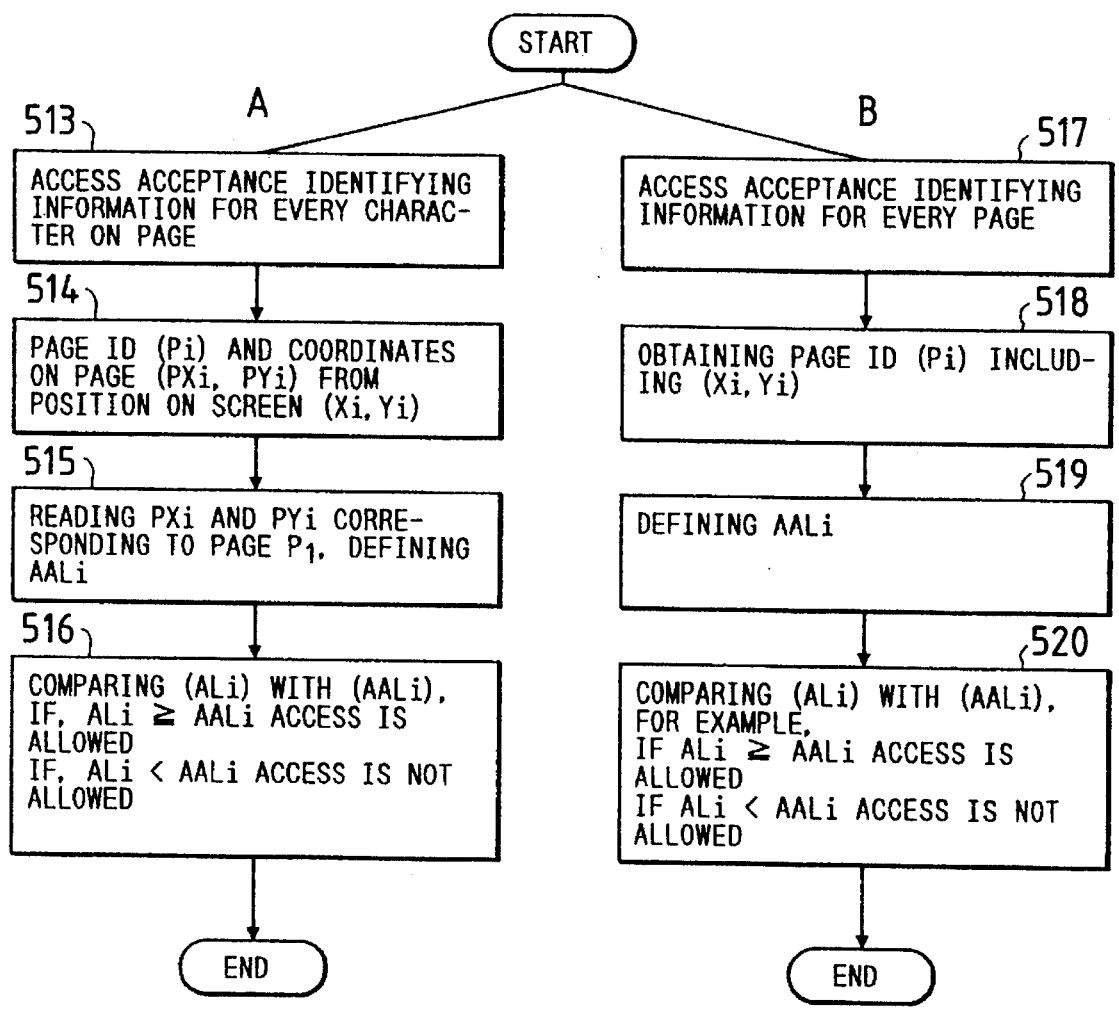
FIG. 14 is a flow chart showing processing based on access levels.

In FIGS. 13 and 14, is shown the flow chart processing within the cursor display control circuit 9 to determine whether the aimed or desired position $X_i$, $Y_i$ can be made with the access level $AL_1$ defined in the cursor or cursor control unit.

In FIG. 13, there are three cases A, B, C for supervising, and selection may be made among these three cases for the type of supervising: actively by the user, upon setup, or as may be fixed at the factory or other location. In case A, in step 500, there is an access level assigned for each cursor in the supervising table of the cursor data storage unit 10 provided as a reference.

In step 501, the cursor control unit identification is established.

In step 502, the cursor data storage unit 10 is accessed to determine the supervising information relating the cursor control unit and the cursor assigned thereto, to acquire the cursor identification. In step 503, the cursor identification is used to determine the access level ALi as obtained from the cursor data storage unit 10. This access level is used in step 504 together with other information from the cursor data storage unit 10 to compare the desired or aimed at position Xi, Yi on the screen with the allowable access to the screen for the specific cursor. According to step 505, the determination is made as to whether the access to the aimed at position is allowed, and the appropriate signal is issued from step 505 to indicate yes or no. The details of step 504 are shown in FIG. 14.

With respect to case B in FIG. 13, the supervising access level is provided for each cursor control unit as a selected reference in step 506. In step 507, the cursor control unit is identified and in step 508 the access level corresponding to the cursor control unit identification is determined from the cursor data storage unit 10 information, and then control passes to step 504.

With respect to case C in FIG. 13, a supervising access level is established for every user in the cursor data storage unit 10 according to step 509. In step 510, the cursor control unit is identified. In step 511, a search is made of the data within the cursor data storage unit 10 to determine the relationship between the cursor control unit and the cursor, so that the user identification can be established. In step 512, this user identification is employed in searching the data in the cursor data storage unit 10 to obtain the access level corresponding to the user identification, and then processing passes to step 504. The details of step 504 in FIG. 13 are shown in FIG. 14, particularly with respect to two different cases A and B.

In case A of FIG. 14, the supervising access acceptance identifying information is provided for every character on the page as reference data in step 513. In step 514, the page identification is obtained as Pi and the coordinates of the page PXi, PYi are established from the information in cursor data storage unit 10 from the position on the screen Xi, Yi. With respect to information such as that disclosed in FIG. 12(a) for example with respect to page 1, data is read out for the column corresponding to PXi and the row corresponding to PYi, from this access acceptance identifying information, and thereby the access acceptance level AALi is defined. In step 516, a comparison is made between the access level ALi and the access acceptance level AALi obtained from step 515 to determine whether or not access is allowed according to the following relationships: if ALi is greater than or equal to AALi then access is allowed, else if ALi is less than AALi then access is not allowed and the appropriate signal is outputted to end the processing. In step 516, other relationships may be used for this comparison.

With respect to case B in FIG. 14, access acceptance identifying information is provided for every page as reference information in the cursor data storage unit 10 in accordance with step 517. In step 518, the page identification Pi and the position on the screen Xi, Yi with respect to the page is determined from the position on the screen. In step 519, this information is used in searching the information in cursor data storage unit 10 to determine the access acceptance identifying information corresponding to the page, which is AALi. In step 520, a comparison is made between ALi and AALi to determine whether or not access is allowed, for example if ALi is greater than or equal to AALi then access is allowed, else if ALi is less than AALi then access is not allowed, and in either case the appropriate signal is outputted to the end of the processing of FIG. 14, which is also the output of FIG. 13. The processing in FIGS. 13 and 14 is conducted in the cursor display control circuit 9 to determine whether access to the aimed position Xi, Yi can be made with the access level ALi defined for the specific requesting cursor or specific requesting cursor control unit 2.

As shown in FIG. 11(d) the rank of priority that can control the cursor is defined for each cursor control unit or alternatively for each user. The cursor display control circuit 9 decides the relationship between the cursor and the cursor control unit 2 according to the ranks of priority. Accordingly, the cursor control unit that has the highest degree of priority among all the operated cursor control units can acquire the power of control over a cursor specific to it or a single cursor common to all of the cursor control units, that is for a particular cursor. When conflicts occur for the power of control of a cursor, ranks of priority of both the cursor control units that are requesting access are compared, and the power of control is transferred to the cursor control unit which ranks highest in priority. When the highest ranking cursor control unit has ceased to operate, the power of control is transferred according to the ranks of priority to the cursor having the next highest rank in priority among the other cursor control units requesting access.

The relationship between cursor and cursor control units can be decided automatically and exclusively. Adjustment can be made without confusion in the case of a system that has a larger number of cursor control units than it has number of cursors, or in the case where a particular cursor is assigned for common use by a plurality of cursor control units. Further, by correlating the cursor control units and the users properly, the proper decision can be made with respect to a relationship in the case of accesses to a page by a plurality of users.

Figure 15:
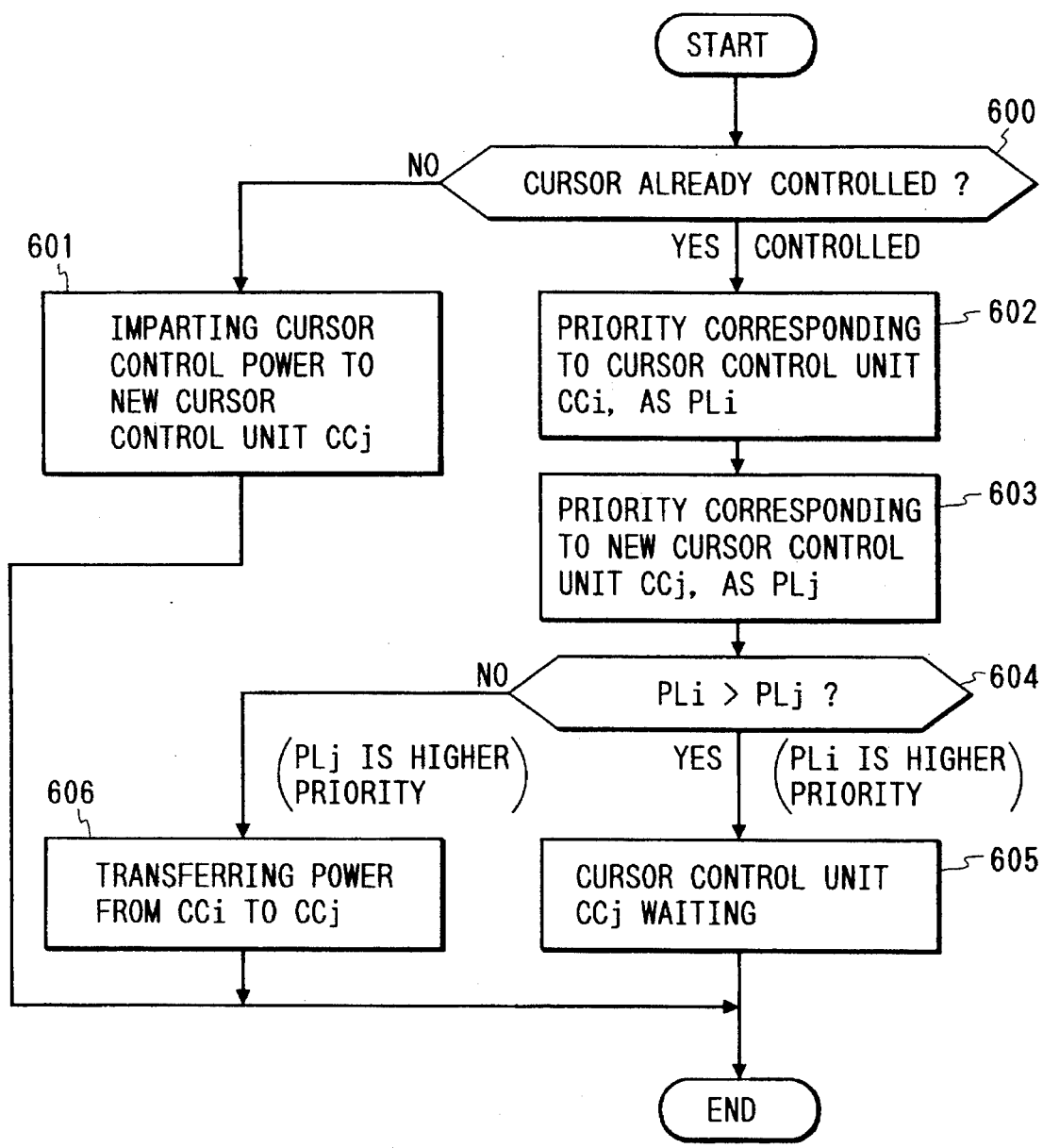
FIG. 15 is a flow chart showing processing for a cursor control unit requesting the power of control for a cursor.

FIG. 15 shows a flow chart for the processing in which a newly operated cursor control unit requesting power over a cursor acquires the power to control the cursor. In FIG. 15, step 600 makes a decision as to whether or not the aimed at or desired cursor is already being controlled by a cursor control unit other than the currently requesting cursor control unit. If the answer is no, step 601 will impart cursor control power to the newly requesting cursor control unit CCj and the process is ended. If the answer to the decision in step 600 is yes, then step 602 will search the cursor data storage unit 10 to determine the priority corresponding to the cursor control unit CCi that is currently controlling the cursor and such priority will be defined as PLi. In step 603, the information within cursor data storage unit 10 is searched to determine the priority PLj corresponding to the new cursor control unit CCj that is requesting access. In step 604, a decision is made as to whether PLi is greater than PLj, and if it is, processing passes to step 605, whereas if it is not, processing passes to step 606. In step 605, the cursor control unit CCj is placed in a waiting state, waiting to acquire cursor control power. In step 606, control power of the cursor is transferred from the cursor control unit CCj to the cursor control unit CCk. After steps 605 and 606, the process ends.

Figure 16:
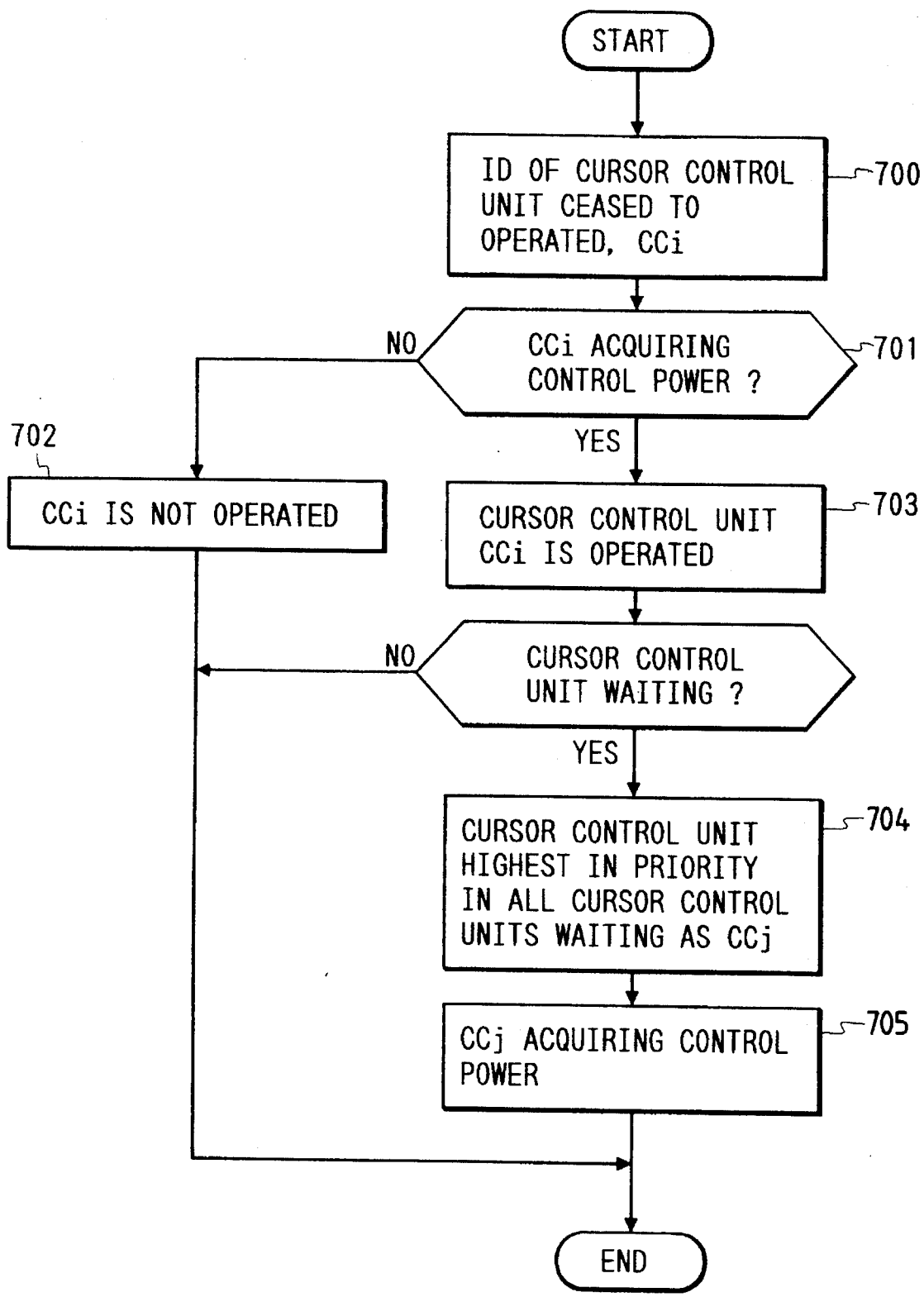
FIG. 16 is a flow chart for the processing of a transferring of the power of control for the cursor when the cursor control previously having the power of control ceases to be operated.

FIG. 16 shows a flow chart for the processing relating to the transfer of power of control of the cursor when the cursor control unit currently in power ceases to operate. In step 700, the cursor control unit having the power over the cursor that ceases to operate is identified as CCi. In step 701, a decision is made as to whether the cursor control unit CCi is acquiring control power. If the answer to step 701 is no, then step 702 establishes a control signal indicating that cursor control unit CCi is not operated and then processing is ended. If the answer to step 701 is yes, then step 703 identifies the cursor control unit CCi as operated. Step 704 determines whether there is a cursor control unit in a state of waiting to acquire control over the cursor, and if there is not the process ends. If there is a cursor control unit waiting to acquire power, then step 704 identifies a cursor control unit having the highest priority among all the cursor control units that are in the state of waiting to acquire power of the cursor, and such highest priority waiting cursor control unit is identified as CCj.

In step 705, the power is transferred to the cursor control unit CCj, so that CCj can now control the cursor.

Figure 18A:
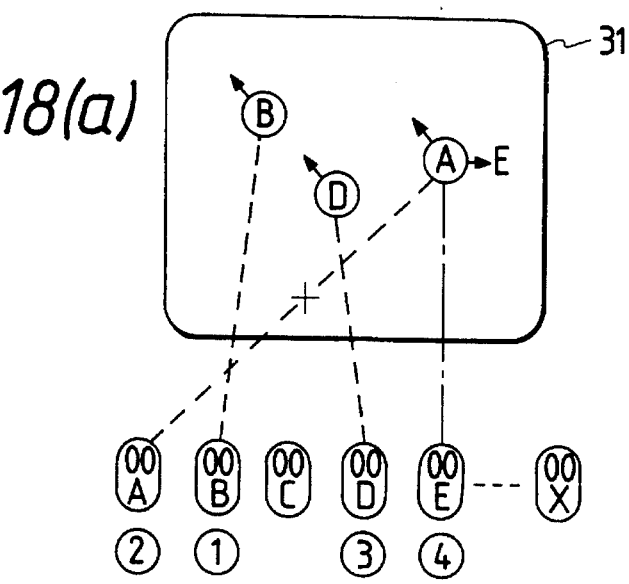
FIGS. 18(a) through 18(d) are examples of cursor control for CAI.

As a specific environment for this system explained so far, the system may be a CAI system, particularly where there is a display blackboard consisting of a large screen 31 as shown in FIGS. 18(a)–18(d). FIG. 18(a) shows an example wherein a plurality of cursors A, B, D are provided with different cursor attributes so that they may be readily identified on the screen and the relationship between the cursors on the screen and cursor control units are exclusive, that is on a one to one basis. A plurality of pupil control mice A, B, C, D, E . . . X are shown having equal status. According to the present invention, the cursors are controlled to limit the number of cursors that can be simultaneously displayed and moved by the pupils, to avoid confusion on the screen. As respective cursors can be identified clearly by the display attributes, such as shapes or colors, they can function as symbols of the pupils that are actually controlling them, or symbols of groups of pupils controlling them. As the number of cursor control units or operators is larger than the number of cursors, the cursors are allotted in the operating order of 1, 2, 3, 4, as indicated, for example on the priority basis of request time. In FIG. 18(a) pupils controlling mice B, A and D have acquired power over the cursors B, A and D. The pupil E is waiting for cursor control, that is the mouse for pupil E is requesting access to the cursor A that is currently being controlled by the pupil controlling mouse A. When the pupil controlling mouse A discontinues operation of the mouse, for example releasing the mouse, the power of control for the cursor A is transferred to pupil E and the visual attributes of the cursor A are now changed to become those of cursor E so that the student controlling the mouse E can readily recognize what cursor is being controlled by mouse E.

Figure 18B:
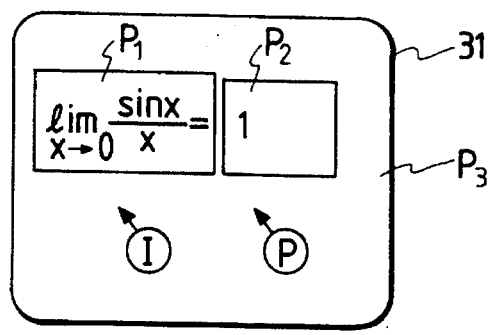

Thus, the mutual relationships or interrelationship between the cursors and cursor control units can be decided on a rational basis and automatically, to avoid confusion. In FIG. 18(b), there is shown an example wherein access levels are defined for the information represented by the cursor on the screen, and the priority access levels of both are compared in operation of the cursor so that access is only made when it is permitted. The instructor, for example, may write a question on the page $P_1$ using the instructor cursor I. The pupil named by the instructor to answer can write the answer on page $P_2$ using the pupil cursor P. The instructor indicates whether the answer is correct or not, how to solve the question, etc., on the page $P_2$ or $P_3$ of screen 31. In this priority case, the access acceptance levels of $P_1$ will permit only the cursor under control of the instructor I so that the access acceptance level of page $P_1$ is only that of the instructor cursor or higher. The access acceptance level of page $P_2$ can be that of the pupil and higher, including the instructor. Therefore, the pupil cannot write or change any information within page $P_1$.

Therefore, the access levels can be defined for respective cursors, and for example, the instructor information on the screen can be protected against change or destruction by a pupil. Further, this also means that the processing function corresponding to the levels of the cursors, for example the purpose of use, are imparted to cursors.

Figure 18C:
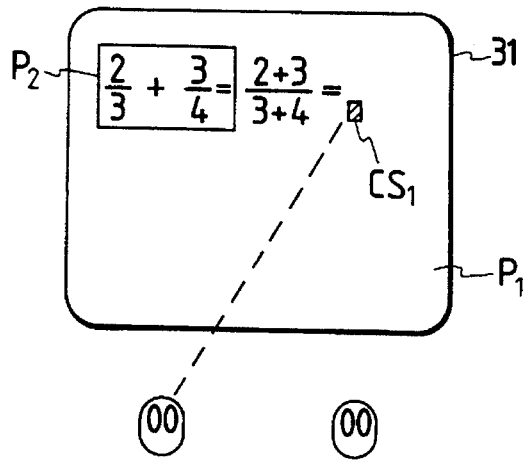
Figure 18D:
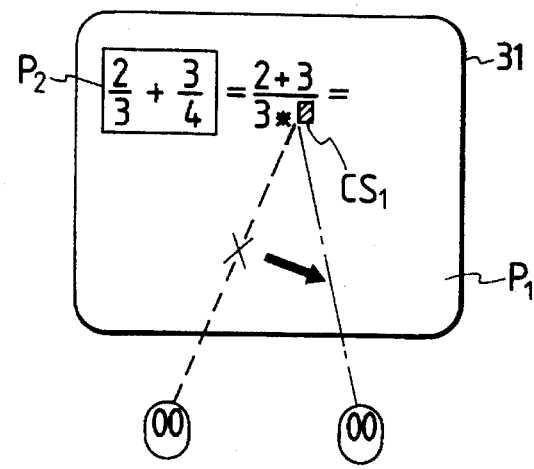

FIGS. 18(c) and 18(d) show examples in which the power of priority for control of the cursors is defined for respective cursor control units. In FIG. 18(c), the instructor has indicated a question on page $P_2$ and a pupil is indicating the answer on the page $P_1$ by the cursor $CS_1$. The dash line shows that the pupil mouse is controlling the cursor $CS_1$, whereas the instructor mouse is inactive. In FIG. 18(d) there is shown the case where the pupil has made a serious mistake, and in this case, the cursor control unit of the instructor, which has a higher priority than the cursor control unit of the pupil, takes control over the cursor $CS_1$, for example by an interrupt, to give advice. This is shown by the dotted line connection between the pupil mouse and the cursor being cut and power being established by the dot-dash line between the instructor mouse and the cursor. In this manner, the ranks of priority can be defined according to the roles of the different operators for controlling the cursors, for example an instructor or pupil, a director or common operator, a skilled or unskilled operator, etc., or according to the histories of waiting times of the cursor operation. Further, if the number of cursors is smaller than the number of cursor control units or when a particular purpose of use is imparted to an arbitrary cursor, etc., the relationship between the cursor control unit requesting access and the cursor can be established automatically and rationally to avoid confusion.

Figure 19A:
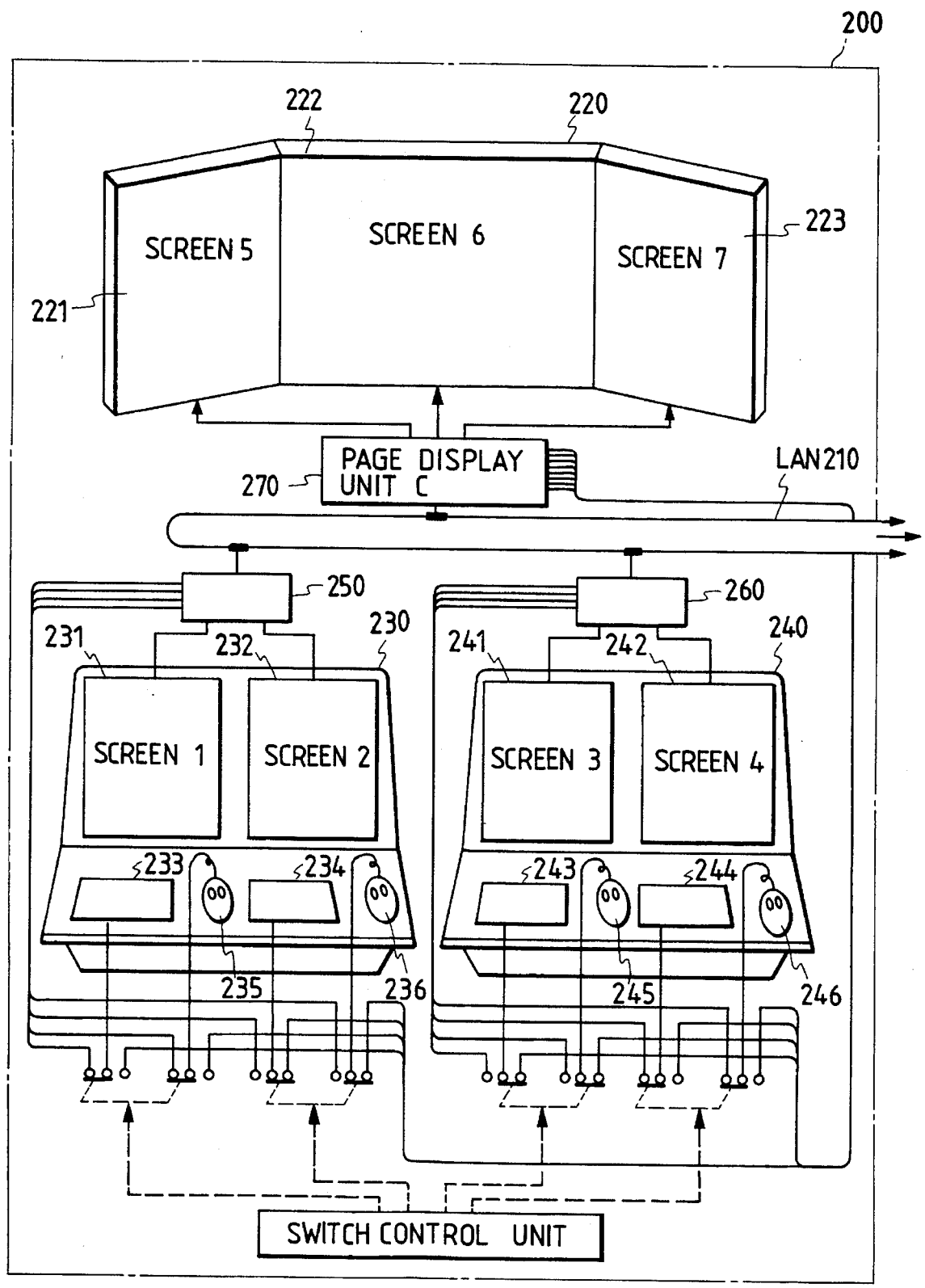
FIG. 19(a) is an example of a specific environment of the present invention, particularly a monitor in a plant.
Figure 19B:
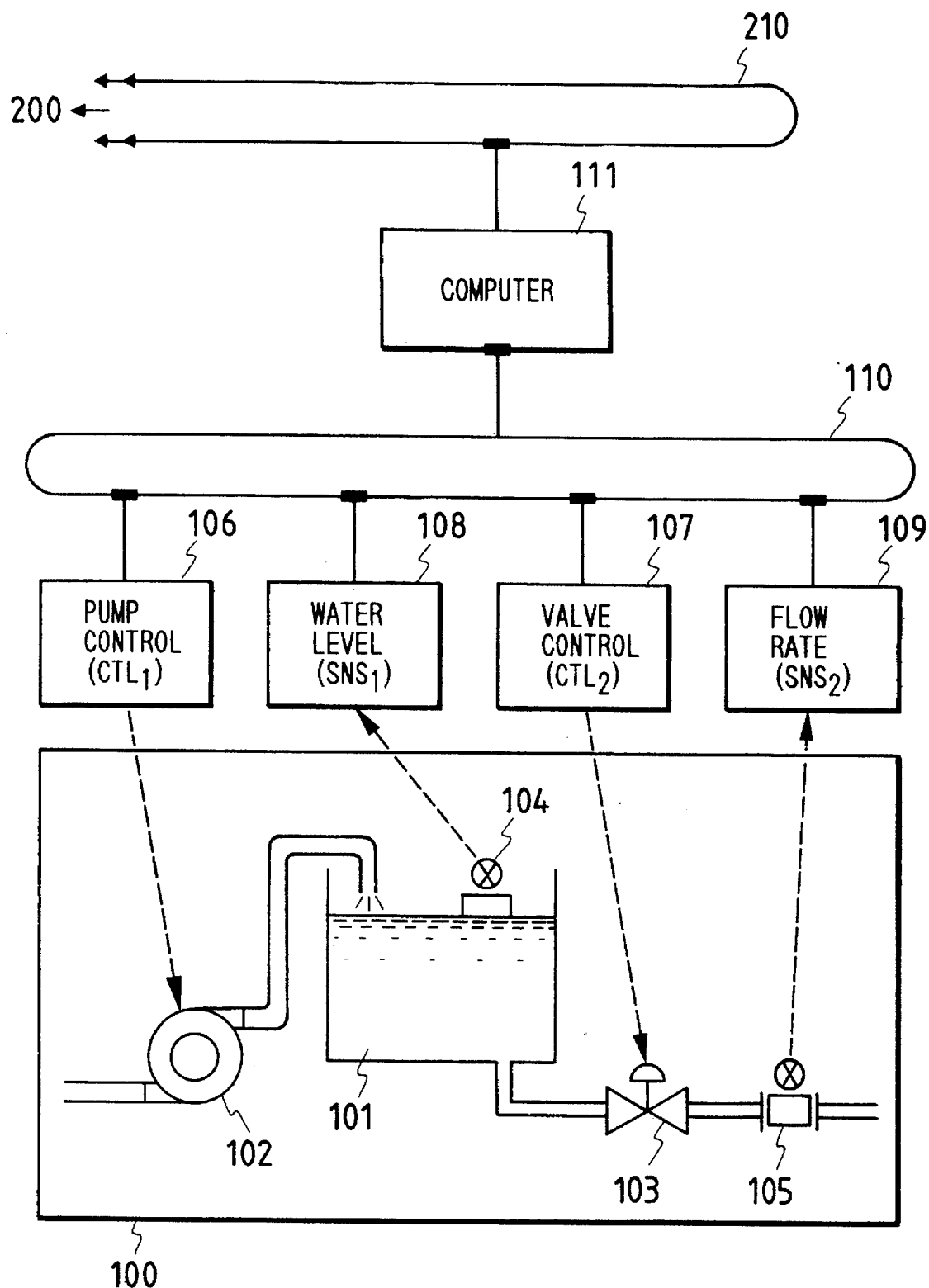
FIG. 19(b) shows the control system for the plant of the example of FIG. 19(a)

As shown in FIGS. 19(a) and 19(b) the system described thus far may be used in the environment of a monitoring and control system for the manufacturing plant.

In FIG. 19(b) there are controllers, such as pump control unit 106 and valve control unit 107, and detectors, such as flow rate detector 109 and water level detector 108. Units 106 and 107 issue control signals CTL1 and CTL2, respectively, whereas detectors 108 and 109 issue measurement result signals SNS1 and SNS2, respectively, to indicate water level and flow rate. Detectors 108 and 109 are respectively associated with a water level indicator 104 and a flow meter 105, whereas controllers 106 and 107 respectively control pump 102 and valve 103. The monitored and controlled plant 100 is provided with a supply water reservoir 101 receiving water from pump 102 to determine the water level and water is removed from the supply water reservoir 101 under the control of the valve 103. A suitable computer 111 is connected to the controllers 106, 107 and the indicators 108, 109, as well as other equipment, by a LAN 110, that is a local area network. In the computer 111, the information collected from the plant (values of water level and flow rate, for example,) and the desired value for control (desired water level and desired flow rates) that are indicated by the operators through the operator/machine system 200 over the local area network LAN 210 are entered. Then, the computer 111 calculates the values of control that are passed over the LAN 110 to the controllers 106, 107 for controlling the pump 102 and the valve 103, respectively. The computer 111 can communicate with the operator and machine system 200 through the LAN 210.

The operator/machine system 200 of FIG. 19(b) is shown in detail in FIG. 19(a) with subdivided screen that includes a multi-screen display unit 220 having three subdivided screens 221, 222, 223, referred to as screen 5, screen 6 and screen 7, respectively. There are two monitoring tables A230 and B240, each being made up of two CRT subdivided screens 231, 232 and 241, 242, respectively referred to as screens 1, 2, 3, 4. Page display units A250, B260 and C270 provide for the display of pages respectively on page displays A230, B240 and 220.

The page display unit A250 displays the page for screens 1 and 2 based upon the command from the computer 111 or reports the established information entered into the page on the screen to the computer for control according to the request from the computer. The page display unit A250 also executes the reporting of the established information, controls the display of cursors on the screen 1 and screen 2 based upon the command by the mouse 235 or the mouse 236 that are respectively operated by different users, stores the established information entered by the operators with keyboard 233 and keyboard 234, and displays the information on the pages. In a like manner, the page display unit B260 is interrelated with screens 3, 4, connected with mice 245, 246, connected with keyboards 243, 244.

The page display unit C, 270, executes the operator and machine processing related with the multi-screen display unit 220, that is for screens 5, 6 and 7, and is connected with the four mice 235, 236, 245, 246 as well as being connected with the four keyboards 233, 234, 243, 244 and has functions similar to the page display units A and B.

Communication is over the indicated LAN 210 and through the operation of switches, for example switches under the control of a switch control unit.

The switches control the connection of page display units 250, 260 and 270 selectively with the mice and keyboards. Screen image lines connect screens 1 and 2 with page display unit 250, connect page display unit 260 with screens 3 and 4, and similarly there are lines between the page display unit 270 and the screens 5, 6, 7. The LAN 210 is also connected to the computer 111 of FIG. 19(b).

FIG. 20 shows the interrelationship among the page display units, the input devices and the screens that are shown in FIG. 19(a). Four mice and four keyboards, placed on the control tables A and B can be used as input devices to the pages on the sub-screens of the control table or as input devices to the page of the multi-screen 220. The switching action for the connection of the mice and keyboard selectively to any one of the page display units is functionally shown. Specifically, each input device 233, 234, 235, 236, 243, 244, 245 and 246 may be selectively connected to any one of page display units A, B or C for the control table by means of the switches under operation of the switch control unit shown in FIG. 19(a). The page display unit C can control the displaying on three sub-screens and process the commands from up to four keyboards and up to four mice simultaneously. The specific construction of the page display unit 270, page display unit C, is shown in FIG. 21(a).

In FIG. 21(a) the screen 221 displays the value of the present water level in window W3 and the value of the requested water level in window W4. Sub-screen 223 displays in window W1 the value of the present flow rate and in window W2 the value of the object flow rate. The page display unit C, 270, includes page drawing mechanism 1C, control mechanism for cursor display 9C, reporting mechanism for establishing information 282, processing mechanism for established input 283, bus within the page display 280, preset information storage memory 281, supervising memory for access acceptance level 11C, page frame memory 5C, and screen image signal generating units 6C respectively for the screens 221, 222 and 223. All of the illustrated devices are connected as shown. The storage memory for established information 281 is a unit which stores the information established at the site on the display sub-screen where an operator can define object at values for control, etc., for each site. The reporting mechanism for establishing information 282 reads out the information from memory 281 according to a command from the computer 111 and reports to the computer 111 through the LAN 210. The process mechanism for established information 283 serves to write characters from keyboards at the established entry positions by cursors indicated on the sub-screens.

Figure 21B:
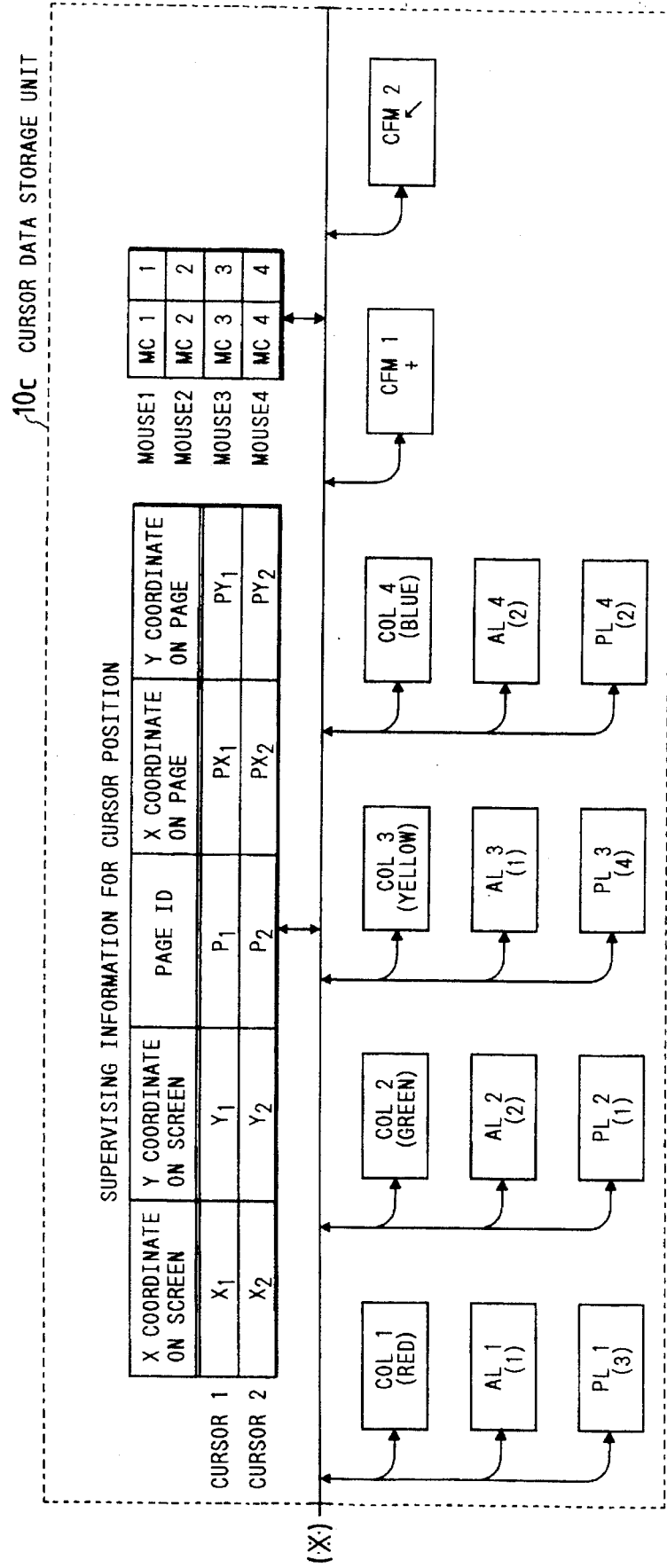
FIG. 21(b) shows the data structure of the cursor data storage unit for the page display unit of FIG. 21(a)

FIG. 21(b) shows an example of the data structure of the cursor data storage unit 10C in the page display unit C. The supervising information for the mouse-cursor relationship here has two roles of a table for supervising the relationship between the cursor control units and cursors and a priority table for waiting for acquisition of the power for control of the cursors. This device is constructed to handle two cursors and four mice, and can establish the following five states:

A "0" indicates that the mouse is in the state of "not operating".

A "1" indicates that the mouse is in the state of "waiting for the acquisition of the power for control of the cursor 1".

A "2" means that the mouse is in the state of "waiting for the acquisition of the power for control of the cursor 2".

A "3" means that the mouse is in the state of "operating the cursor 1".

A "4" means that the mouse is in the state of "operating the cursor 2".

In this manner, the situation may occur in which a plurality of cursors are in the state 0, 1 or 2, but there cannot be a situation that there are a plurality of cursors in the state 3 or 4 respectively. This is supervised exclusively by the cursor display control mechanism 9C.

The attributes of cursors in the example are composed of four attributes, by way of example, that is the shapes, colors, access levels and other priority.

The shapes of the cursors are adapted to be defined for respective cursors. This is because it is desirable to recognize the task being executed by the shape of the cursor. By way of example, the cursor 1 having a visual attribute "+" denotes "the cursor for the task of monitoring and deciding the water levels", and the cursor 2 having the shape attribute "←" denotes "the cursor for the task of monitoring and deciding the flow rates". Thus, "CFM1" and "CFM2" are defined corresponding to the two cursors respectively for the purpose of storing the shapes of the cursors.

The colors of the cursors are for the purpose of defining respective mice, because it is desirable to identify the mouse or operator operating the cursor by the color of the cursor. Thus, "COL1", "COL2", "COL3" and "COL4" define respectively four mice by different colors.

The access levels are adapted to be defined similarly for respective mice, because it is desirable to have access levels determined preliminarily for the respective mice or operators corresponding to the roles or ranks, and to decide whether to access information on the page based upon the access levels allotted to the mouse or to the operator operating the cursor at the moment. Thus, "AL1", "AL2", "AL3" and "AL4" are defined corresponding to the four mice respectively for the stored access levels.

The "priority" must be defined similarly with respect to the mice, for example "PL1", "PL2", "PL3" and "PL4" are defined corresponding to the four mice.

Next, an example will be given wherein there are simultaneous accesses to the pages on the sub-screens 5, 6 and 7 controlled by the page display control units C in the monitor and control system for the supply water reservoir.

As shown in FIG. 22, there are four operators a, b, c, d that sit before the operating tables A, B. The operators monitor and control the water level of or the discharge flow rate from the supply water reservoir by operating their own mice and keyboards.

As seen, operator a operates mouse 1 at a status of a member on duty. Operator a is in charge of the main task of monitoring water level, and is allowed to execute the monitoring flow rate of another, but is not allowed to execute a decision to produce an object value of either the water level or the flow rate. These are the powers of the operator b. The operator a has a priority 3 for acquiring the cursor among the four members on duty and has an access level 1 that defines the content of tasks mentioned above.

In FIG. 22, the operator b is the chief of the members on duty and is in charge of deciding the value of the object water level and flow rate for another, and is allowed to hold the monitoring task. That is, operator b can act for the sub-chief of the members on duty who are in charge of deciding the object flow rate, and can monitor the water level and monitor the flow rate of which the operator a and the operator c are in charge, respectively. Operator b has the access level 2 that defines the above tasks and the highest priority level 1. Operator b controls mouse 2.

Operator c controls mouse 3 at monitoring table B as a member on duty with the main task at monitoring table B of monitoring the flow rate. The tasks of operator c include monitoring the flow rate as a main task, and opector c is permitted to execute monitoring water level for another, but is not allowed to decide the object value. Operator c has the lowest priority, 4, and the access level 1 that determines the above-mentioned tasks.

Operator d, who is the sub-chief member on duty at the monitoring table B for control of the mouse 4 has the task of deciding the value of the aimed flow rate as a main task and is allowed to execute the deciding of water level for another in addition to being allowed to hold the monitoring task. That is, the operator d can execute for the chief the task of deciding the object water level, which is the main task of the chief in charge. The sub-chief can also monitor the water level and the flow rate, which are the main tasks of the operators a and c, respectively. The access level of operator d is 2, which defines the above tasks and the operator d has the priority 2 for acquiring the cursor.

The access levels to the information on the page and the cursor acquisition priority for acquiring the cursor to be moved on the page are thereby determined, taking the tasks and powers of four operators into account.

Specifically, the access levels of the chief and the sub-chief who are in charge of the task of deciding the object values are determined as "2", and the operation of writing is allowed to be made in the spaces for object values of the page, while the access levels of the other members a and c are determined as "1", and the operation of writing in the spaces for object values is prohibited by operators a, c.

The two cursors, one having the task of monitoring and deciding water level and the other having the task of monitoring and deciding flow rate, are displayed on the page. The cursors for the task of monitoring and deciding the water level are normally in common use mainly by the operators a and b. On the other hand, the cursor for the tasks of monitoring and deciding flow rate is normally in common use mainly by the operators c and d. Here, because any operator may execute the task of others within the allowed power when other operators are absent, the mutual relationships of the respective mice and two cursors are adapted to be determined in this example so that the two cursors are in common use by all four operators.

The operation of each operator and the functions of the cursors will be explained at the times t1 through t11, as shown for a simulated control sequence in FIG. 22.

Time t1: the operator a starts the operation of monitoring water level and acquires control of the cursor "+".

Time t2: the operator c starts the operation of monitoring the flow rate and acquires control of the cursor "←".

Time t3: the operator d (the sub-chief) designates the task of monitoring and deciding the water level by mistake and operates the mouse under that state, the cursor "+" operated by the operator a is thereby taken by the operator d. The operator a is put into the state of "waiting for a cursor".

Time t4: the operator c finishes the operation of monitoring the flow rate and relinquishes control of the cursor "←".

Time t5: the operator b (the chief) notices that the operator d (the sub-chief) has executed the operation of deciding the water level by mistake, and hastily operates the mouse 2 to therefore take power over the operation of the cursor "+" and executes the operation of deciding the water level correctly.

Time t6: the operator d (the sub-chief) notices his own mistake owing to the interrupt operation of the operator b (the chief) and ceases to operate the mouse 4.

Time t7: the operator d (the sub-chief) correctly designates the tasks of monitoring and deciding the flow rate this time, and acquires the control over the cursor "←" and starts the operation of deciding the flow rate.

Time t8: the operator c tries to execute the operation of monitoring the flow rate again and operates the mouse 3, but the cursor "←" is in use by the operator d with a higher rank of priority, so that the operator c then enters the state of waiting for the cursor.

Time t9: as the operator b (the chief) has finished the operation of deciding the water level and freed the cursor, the operator a who is in a state of waiting for the acquisition of the cursor for the operation of monitoring the water level acquires control over the cursor "+" and starts the operation of monitoring the water level again.

Time t10: as the operator d (the sub-chief) has finished the operation of deciding the flow rate and freed the mouse, the operator c who is in the state of waiting for the acquisition of the cursor, acquires the cursor "←" and starts the operation of monitoring the flow rate again.

Time t11: the operator a finishes the operation of monitoring the water level and frees the cursor "+".

According to the system for monitoring and controlling an industrial plant described above, there is a situation where a plurality of users have cursors corresponding to the purposes of tasks for common use. Transfer of the power for control of the cursors can be made rationally and automatically, for example by degrading the ranks of priority in the order of the chief of the members on duty, the sub-chief and the other members on duty, and by allowing the chief to acquire cursors immediately when needed. Also, when cursors for the same task are used, it is possible to determine whether access to the information on the page can be made or not according to the access levels of the users of the cursors, for example by allowing only the chief of the members on duty or the sub-chief to decide and enter the information, and such situations can be prevented in which the information on the page is unduly changed or destroyed by users without effective capacity. Further, as the shapes of the cursors are designated for the respective cursors by the attributes symbolizing the task and on the other hand the attributes of colors of the cursors are designated for the respective mice as the attributes symbolizing the users that are in control of the mice, the aimed task of the user executing the task can be identified at a glance to the cursor on the page.

Figure 23:
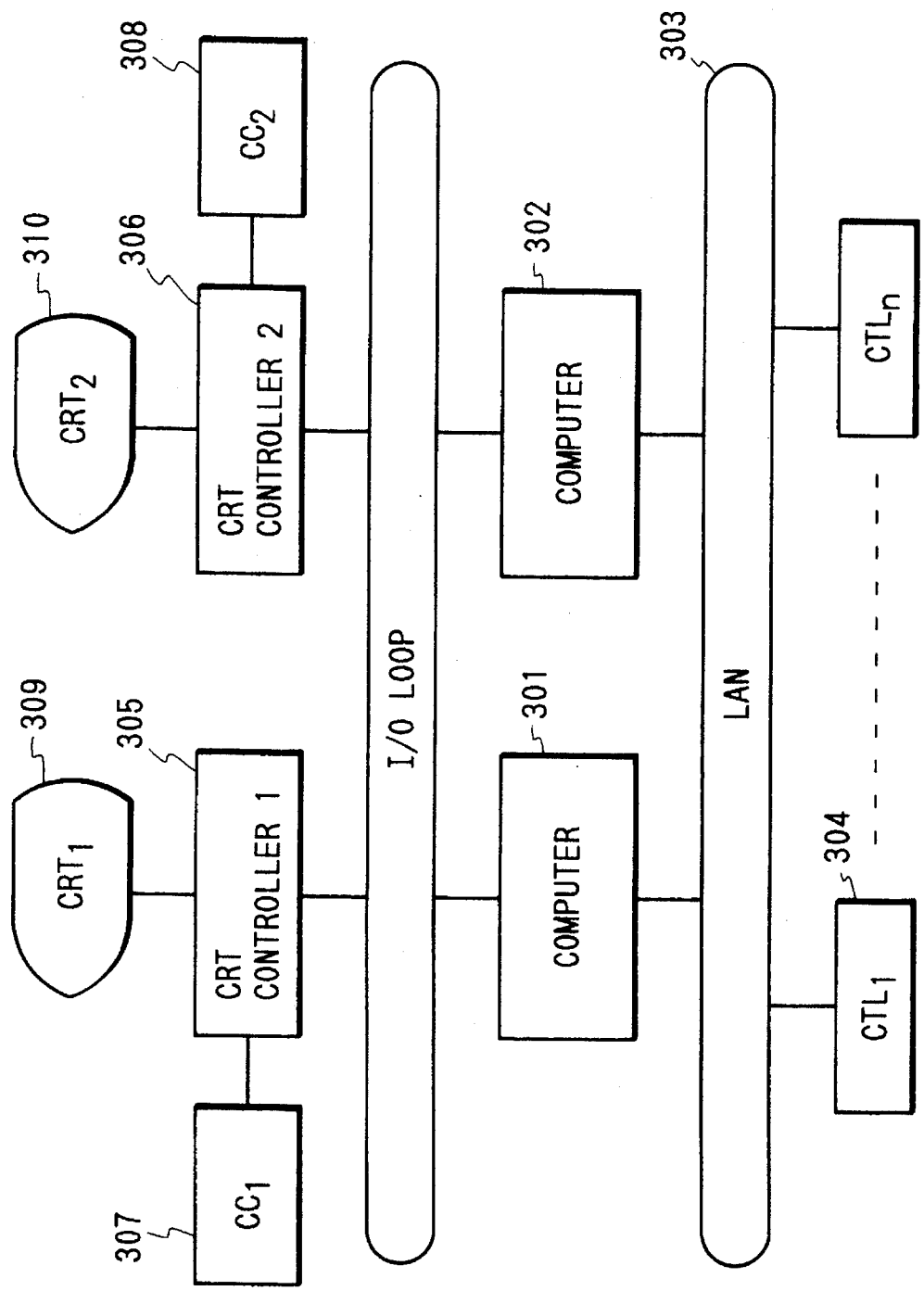
FIG. 23 shows the system for monitoring and controlling a plant.

Another example of the embodiment of the present invention being used for the control of a plant is shown in FIG. 23, schematically. The controllers 304, CTL1 ... CTLn, of the plant are controlled through a local area network, LAN, 303 by a computer for operating and monitoring 301. The parameters of each controller 304 are stored in a computer for maintenance 302. The computer for monitoring the operation 301 displays trends of the system or data of monitoring, etc., on the display CRT 309 through the CRT controller 305. On the other hand, the computer for maintenance 302 displays preset parameters, etc., on the CRT2, 310, through the CRT controller 306. The cursor control unit CC1, 307, of the CRT1 is adjusted to have the access level only of displaying parameters, and the cursor control unit CC2, 308, for the CRT2 has the access level for displaying and deciding parameters. The computers 301 and 302 are connected through an input/output loop to the controllers 305 and 306.

Examples of the displays on the CRT1 and the CRT2 will now be shown. In FIG. 24(a) an element for control of the control system diagram is selected by the cursor "←" for CRT2, while the CRT1 displays another page and the cursor "▼" for another role. In FIG. 24(b) the window displays the parameters of the element for control selected in the steps shown in FIG. 24(a) for both the CRT1 and the CRT2, and the parameter T is selected by the cursor for the CRT2. In FIG. 24(c), the up/down button for the parameter T is adjusted by the cursor of the CRT2 and the value of T is changed from 10 to 12.

Therefore, the enhancement of maintenance and management is made possible by allowing the change of data only in the cursor control unit for maintenance CC2 of FIG. 23 and supervising by means of the identification of users, etc. On the other hand, by displaying the same data page on another CRT, the confirmation of the data decided by a plurality of operators is possible, and reliability can be increased.

Thus, the control of displaying cursors in this invention is not limited to a single display unit, but can be similarly realized in the system wherein a plurality of display sub-screens are employed.

In the present invention, in page displaying, a plurality of cursors can be displayed on one screen and simultaneous accesses can be made from the corresponding cursor control units in an orderly fashion, thus there is an advantage that the improvement in efficiency and quality of the task can be achieved by dividing a plurality of tasks according to their kinds of importance, and sharing the tasks among a plurality of operators who are monitoring the page by common use, according to their priority of ranks or experiences.

Also, visual attributes of the cursors may be provided such as shapes, colors or traces of motion according to the identity of the cursors or identity of the cursor control units, and arbitrary combinations provided, so that identification of a plurality of cursors appearing in the screen simultaneously to be operated by different operators and users can be extremely simple. Moreover, there is the advantage that cursors for individual purposes have good operability and can have the attributes of their abilities, such as range of movement with respect to others.

Furthermore, as the access levels for control of displaying on a page can be allotted to cursors for cursor control units, there is an advantage that disorder in operation can be prevented by grading the accesses among a plurality of operators by priority, thus mistakes by unskilled operators can be prevented so that the operability and reliability can be improved.

Still further, as a plurality of cursors and a plurality of cursor control units can be related exclusively among themselves and the ranks of priority for acquisition of the cursors can be defined for the cursor control units, there is an advantage that the page displaying by a plurality of operators can be controlled with order so that the operability and reliability can be improved.

As mentioned above, the invention can provide for a picture display as applied to a CAI system or a system for monitoring and controlling a plant using large sub-screens such as multi-screens, etc., or in television conference systems, with excellent operability and reliability.

While a preferred embodiment has been described with variations, further embodiments, variations and modifications are contemplated within the spirit and scope of the following claims.

We claim:

1. An apparatus for screen display of information, comprising:

means for displaying a plurality of cursors indicating access to information;

a plurality of input units for respectively operating said cursors;

means establishing access levels of the cursors;

means for establishing access acceptance levels corresponding to information on the display;

means for comparing an access acceptance level of information indicated by a cursor with an access level of the indicating cursor; and means for controlling screen display based upon an access signal from one of the input units that falls within said access acceptance level.

2. The apparatus of claim 1, including means providing each of said cursors with visual attributes uniquely corresponding with the access level of each cursor.

3. The apparatus of claim 2, wherein said visual attributes are different cursor shapes.

4. The apparatus of claim 2, wherein said visual attributes are different cursor colors.

5. The apparatus of claim 1, wherein said access acceptance levels correspond to different subscreen areas.

6. An apparatus for screen displaying, comprising:

screen means displaying a plurality of cursors each being defined by a respective cursor ID and information;

plural input means for accessing the information through operating the cursors;

means for defining respective access levels of the cursors;

means for defining an access acceptance level of the information; and means for permitting a particular cursor to access particular information when the access level of the particular cursor satisfies the access acceptance level of the particular information.

7. An apparatus according to claim 6, wherein said means for permitting permits the particular cursor having a highest access level to access the particular information when a plurality of the cursors try to access the same particular information.

8. A method for screen displaying, comprising the steps of:

displaying plural cursors each being defined by a respective cursor ID on a screen of an apparatus for screen displaying;

operating the cursors by plural input means, each being defined by an input means ID;

defining respective access levels of the plural input means by using the input means ID;

defining respective access acceptance levels of the cursors by using the cursor ID; and supervising the cursors and the plural input means based on the cursor ID and the input means ID to exclude the possibility that each cursor is operated by plural input means at the same time and so that a particular input means, whose access level satisfies the access acceptance level of a particular cursor, operates the particular cursor.

9. A method for screen displaying, comprising:

displaying plural cursors, each being defined by a respective cursor ID and a type of information to which plural input means may give access through operating the cursors;

defining a respective access level for each of the cursors;

defining a respective access acceptance level for each of the types of information;

comparing an access acceptance level of information requested by a cursor to an access level of the cursor; and operating a particular cursor to give access to particular information when the access level of the particular cursor satisfies the access acceptance level of the particular information.

10. A method for screen displaying according to claim 9, wherein said operating step permits only a particular cursor having a highest access level to obtain access to the information when a plurality of the cursors try to access the same information.

* * * * *